(12) United States Patent
Slocum et al.

(10) Patent No.: US 12,296,940 B2
(45) Date of Patent: May 13, 2025

(54) LIFTING GAS GENERATION

(71) Applicant: LTAG SYSTEMS LLC, Bow, NH (US)

(72) Inventors: Jonathan T. Slocum, Bow, NH (US); Alexander Slocum, Bow, NH (US)

(73) Assignee: LTAG SYSTEMS LLC, Bow, NH (US)

( * ) Notice: Subject to any disclaimer, the term of this patent is extended or adjusted under 35 U.S.C. 154(b) by 1 day.

(21) Appl. No.: 17/967,818

(22) Filed: Oct. 17, 2022

(65) Prior Publication Data

US 2023/0159149 A1 May 25, 2023

Related U.S. Application Data

(60) Provisional application No. 63/256,624, filed on Oct. 17, 2021.

(51) Int. Cl.
*B64B 1/62* (2006.01)
*F16L 37/18* (2006.01)
(Continued)

(52) U.S. Cl.
CPC ............... *B64B 1/62* (2013.01); *F16L 37/18* (2013.01); *A63H 2027/1033* (2013.01);
(Continued)

(58) Field of Classification Search
CPC ..... B64B 1/58; B64B 1/62; B64B 1/40; F16L 37/18; A63H 2027/1033; B01J 19/0053; G01W 1/08
See application file for complete search history.

(56) References Cited

U.S. PATENT DOCUMENTS

| 1,614,117 A | 1/1927 | Geldhof |
| 2,384,720 A * | 9/1945 | Rethwisch ............... A47J 36/28 206/541 |

(Continued)

FOREIGN PATENT DOCUMENTS

| CA | 2800795 A1 | 3/2013 |
| CN | 101198737 A | 6/2008 |

(Continued)

OTHER PUBLICATIONS

U.S. Patent and Trademark Office, "Non-Final Office Action" issued in related U.S. Appl. No. 16/804,676 dated Jul. 21, 2021 (17 pages). (NFOA of Jul. 2021).

(Continued)

*Primary Examiner* — Nicolas A Arnett
(74) *Attorney, Agent, or Firm* — THE MARBURY LAW GROUP, PLLC

(57) ABSTRACT

According to one aspect, a reactor for generating lifting gas may include a first port, a second port, a coupling releasably securable in fluid communication with an aerostat, and a tank including a base and a crown defining at least a portion of a chamber therebetween, the first port and the coupling each supported on the crown, the second port supported on the tank away from the crown, the chamber in fluid communication with each one of the first port, the second port, and the coupling, the chamber expandable between the crown and the base from an uninflated state to an inflated state and, with the tank in the inflated state, a maximum height of the chamber less than a maximum dimension of the base.

19 Claims, 16 Drawing Sheets

(51) Int. Cl.
   *A63H 27/10* (2006.01)
   *B01J 19/00* (2006.01)
   *B64B 1/40* (2006.01)
   *G01W 1/08* (2006.01)

(52) U.S. Cl.
   CPC ............ *B01J 19/0053* (2013.01); *B64B 1/40* (2013.01); *G01W 1/08* (2013.01)

(56) References Cited

U.S. PATENT DOCUMENTS

| | | | |
|---|---|---|---|
| 3,014,689 A * | 12/1961 | Soderstrom | F16L 37/252 |
| | | | 285/119 |
| 3,117,424 A * | 1/1964 | Hebenstreit | B63C 9/18 |
| | | | 62/48.1 |
| 3,118,465 A | 1/1964 | Scaramucci | |
| 3,204,320 A | 9/1965 | Eckstein et al. | |
| 3,270,920 A | 9/1966 | Nessler | |
| 3,381,655 A * | 5/1968 | Rozzelle | F16K 15/20 |
| | | | 116/210 |
| 3,402,738 A * | 9/1968 | Perolo | F16L 37/244 |
| | | | 137/614.11 |
| 3,502,298 A * | 3/1970 | Paddington | F16L 37/107 |
| | | | 285/361 |
| 3,514,076 A | 5/1970 | Wheatley | |
| 3,549,123 A | 12/1970 | Bell et al. | |
| 3,554,707 A | 1/1971 | Holmes et al. | |
| 3,575,381 A * | 4/1971 | Gilmore | F16K 1/2263 |
| | | | 251/359 |
| 3,878,081 A | 4/1975 | Reding | |
| 3,993,595 A | 11/1976 | Merkl | |
| 4,049,158 A | 9/1977 | Lo et al. | |
| 4,084,711 A | 4/1978 | Armstrong | |
| 4,133,513 A | 1/1979 | Meyer | |
| 4,134,491 A * | 1/1979 | Turillon | F17C 11/005 |
| | | | 220/88.1 |
| 4,264,018 A * | 4/1981 | Warren | B65D 83/0055 |
| | | | 222/386.5 |
| 4,280,288 A | 7/1981 | Corfa et al. | |
| 4,358,291 A | 11/1982 | Cuomo et al. | |
| 4,446,636 A | 5/1984 | Weinert | |
| 4,586,456 A * | 5/1986 | Forward | B64B 1/40 |
| | | | 244/33 |
| 4,770,848 A | 9/1988 | Ghosh et al. | |
| 4,944,242 A | 7/1990 | Russell | |
| 4,982,929 A * | 1/1991 | Spurling | F16L 37/18 |
| | | | 251/89.5 |
| 4,998,708 A | 3/1991 | Pavanel | |
| 5,137,179 A | 8/1992 | Stoffel | |
| 5,152,501 A | 10/1992 | Raymond, Jr. | |
| 5,240,449 A | 8/1993 | Sloan et al. | |
| 5,284,182 A | 2/1994 | McLennan | |
| 5,301,631 A * | 4/1994 | Vining | G08B 5/002 |
| | | | 116/210 |
| 5,372,617 A * | 12/1994 | Kerrebrock | C01D 15/02 |
| | | | 366/310 |
| 5,456,492 A * | 10/1995 | Smith | B60R 21/26 |
| | | | 137/68.13 |
| 5,494,538 A | 2/1996 | Kirillov et al. | |
| 5,533,751 A * | 7/1996 | Kort | B60R 21/272 |
| | | | 280/741 |
| 5,555,839 A | 9/1996 | Staten et al. | |
| 5,605,481 A | 2/1997 | Van Raden | |
| 5,620,652 A | 4/1997 | Tack et al. | |
| 5,707,499 A * | 1/1998 | Joshi | H01M 50/121 |
| | | | 204/266 |
| 5,732,752 A | 3/1998 | Glessner et al. | |
| 6,386,137 B1 * | 5/2002 | Riche | B64B 1/40 |
| | | | 441/89 |
| 6,506,360 B1 * | 1/2003 | Andersen | C01F 7/428 |
| | | | 423/657 |
| 6,638,493 B2 | 10/2003 | Andersen et al. | |
| 6,648,272 B1 | 11/2003 | Kothmann | |
| 7,147,004 B1 | 12/2006 | Hartman | |
| 7,344,267 B2 | 3/2008 | Carito | |
| 7,356,390 B2 | 4/2008 | Knoblach et al. | |
| 7,364,815 B2 * | 4/2008 | Nakagawa | H01M 8/2475 |
| | | | 429/483 |
| 7,503,277 B2 | 3/2009 | Boschma, Jr. et al. | |
| 7,540,892 B2 | 6/2009 | Strizki et al. | |
| 7,588,087 B2 | 9/2009 | Cafferata | |
| 7,666,386 B2 | 2/2010 | Withers-Kirby et al. | |
| 7,803,349 B1 * | 9/2010 | Muradov | B01J 7/02 |
| | | | 423/657 |
| 7,871,036 B2 * | 1/2011 | Zubrin | B64B 1/62 |
| | | | 244/31 |
| 8,157,205 B2 | 4/2012 | McWhirk | |
| 8,161,996 B2 | 4/2012 | Barker et al. | |
| 8,225,927 B2 | 7/2012 | Narendrnath et al. | |
| 8,418,435 B2 * | 4/2013 | Hatoum | C01B 13/0214 |
| | | | 60/217 |
| 8,430,704 B2 | 4/2013 | Jeffrey | |
| 8,522,835 B2 | 9/2013 | McLean et al. | |
| 8,579,158 B2 | 11/2013 | Rice | |
| 8,697,027 B2 | 4/2014 | Uzhinsky et al. | |
| 8,864,064 B2 | 10/2014 | DiMarzio et al. | |
| 8,974,765 B2 * | 3/2015 | Boyle | C01B 3/08 |
| | | | 423/658.2 |
| 9,090,323 B1 | 7/2015 | Ratner | |
| 9,174,140 B2 | 11/2015 | Nelson et al. | |
| 9,346,532 B1 | 5/2016 | Ratner | |
| 9,511,844 B1 | 12/2016 | DeVaul | |
| 9,619,977 B2 | 4/2017 | Graham et al. | |
| 9,624,103 B1 * | 4/2017 | Woodall | C01B 3/08 |
| 9,853,360 B2 | 12/2017 | Sylvia et al. | |
| 9,902,480 B1 | 2/2018 | Cromie et al. | |
| 10,113,534 B2 | 10/2018 | Sia | |
| 10,236,930 B1 | 3/2019 | Ferraro | |
| 10,258,950 B2 | 4/2019 | Kmetich et al. | |
| 10,556,709 B1 | 2/2020 | Kimchi et al. | |
| 10,612,683 B2 | 4/2020 | Clayton et al. | |
| 10,737,754 B1 | 8/2020 | Farley et al. | |
| 10,745,789 B2 * | 8/2020 | Slocum | C23C 2/02 |
| 10,787,268 B2 | 9/2020 | Leidich et al. | |
| 10,829,192 B1 | 11/2020 | Farley et al. | |
| 10,829,229 B2 | 11/2020 | MacCallum et al. | |
| 10,988,227 B2 | 4/2021 | MacCallum et al. | |
| 10,995,680 B2 | 5/2021 | Tanaka et al. | |
| 11,111,141 B1 | 9/2021 | Slocum et al. | |
| 11,130,557 B1 * | 9/2021 | Slocum | B64B 1/40 |
| 11,141,671 B2 | 10/2021 | Harter et al. | |
| 11,142,318 B2 | 10/2021 | Thrun et al. | |
| 11,148,947 B1 | 10/2021 | Slocum et al. | |
| 11,203,430 B2 | 12/2021 | Heppe | |
| 11,268,180 B2 | 3/2022 | Slocum | |
| 11,287,050 B2 | 3/2022 | VanLaningham et al. | |
| 11,312,466 B1 * | 4/2022 | Slocum | B64B 1/40 |
| 11,318,437 B1 | 5/2022 | Slocum et al. | |
| 11,332,366 B2 * | 5/2022 | Slocum | C01B 3/08 |
| 11,661,339 B1 | 5/2023 | Mahar et al. | |
| 11,738,849 B1 * | 8/2023 | Slocum | B64B 1/40 |
| | | | 244/31 |
| 11,772,062 B1 | 10/2023 | Slocum et al. | |
| 2002/0088178 A1 * | 7/2002 | Davis | B01J 19/22 |
| | | | 48/65 |
| 2003/0024323 A1 | 2/2003 | Wang et al. | |
| 2003/0062444 A1 * | 4/2003 | Goodey | B64B 1/62 |
| | | | 244/24 |
| 2003/0235724 A1 | 12/2003 | Ord et al. | |
| 2006/0278757 A1 | 12/2006 | Kelleher | |
| 2007/0057116 A1 * | 3/2007 | Sinsabaugh | B64B 1/62 |
| | | | 244/96 |
| 2007/0217972 A1 * | 9/2007 | Greenberg | C01B 3/08 |
| | | | 422/232 |
| 2008/0063597 A1 | 3/2008 | Woodall et al. | |
| 2008/0193806 A1 * | 8/2008 | Kulakov | H01M 8/065 |
| | | | 429/515 |
| 2009/0127137 A1 | 5/2009 | Golz et al. | |
| 2009/0208404 A1 | 8/2009 | Itoh | |
| 2010/0028255 A1 * | 2/2010 | Hatoum | C01B 13/0214 |
| | | | 423/657 |
| 2010/0038477 A1 | 2/2010 | Kutzmann et al. | |

(56) References Cited

U.S. PATENT DOCUMENTS

| | | | |
|---|---|---|---|
| 2010/0061923 | A1* | 3/2010 | Reddy ................. B01J 7/02 422/242 |
| 2010/0068132 | A1 | 3/2010 | Vencill et al. |
| 2010/0112396 | A1* | 5/2010 | Goldstein ............... C25B 1/55 977/773 |
| 2010/0200693 | A1* | 8/2010 | Zubrin ..................... B64B 1/62 244/97 |
| 2010/0230121 | A1 | 9/2010 | Hall et al. |
| 2010/0276537 | A1 | 11/2010 | Kutzmann et al. |
| 2012/0052001 | A1* | 3/2012 | Woodall ................ C22C 21/00 423/657 |
| 2012/0100443 | A1* | 4/2012 | Braithwaite ............ B01J 19/20 429/421 |
| 2012/0107228 | A1* | 5/2012 | Ishida ................... C22C 30/04 420/580 |
| 2012/0318660 | A1 | 12/2012 | Cohly et al. |
| 2013/0004865 | A1 | 1/2013 | Stimits et al. |
| 2013/0028809 | A1 | 1/2013 | Barton et al. |
| 2013/0115544 | A1 | 5/2013 | Davidson et al. |
| 2013/0248748 | A1 | 9/2013 | Baumann |
| 2014/0050625 | A1 | 2/2014 | Zheng et al. |
| 2014/0097289 | A1 | 4/2014 | Heppe |
| 2014/0231132 | A1 | 8/2014 | Watanabe |
| 2014/0231281 | A1* | 8/2014 | Young .................... B65D 23/02 53/474 |
| 2015/0204486 | A1 | 7/2015 | Hoffmann |
| 2015/0258298 | A1* | 9/2015 | Satoh ................ A61M 16/0057 128/202.26 |
| 2016/0207605 | A1 | 7/2016 | Jensen et al. |
| 2016/0257415 | A1 | 9/2016 | Ye et al. |
| 2016/0289917 | A1 | 10/2016 | Sakamoto |
| 2016/0355918 | A1* | 12/2016 | Slocum ................. H01M 8/065 |
| 2017/0022075 | A1 | 1/2017 | Ritchie et al. |
| 2017/0022078 | A1* | 1/2017 | Fukuoka .................... A23L 2/54 |
| 2017/0355460 | A1 | 12/2017 | Shannon et al. |
| 2017/0355462 | A1 | 12/2017 | Hoheisel |
| 2018/0237141 | A1 | 8/2018 | Heppe |
| 2018/0280743 | A1* | 10/2018 | Walker .................... A62C 33/00 |
| 2019/0024216 | A1 | 1/2019 | Giri et al. |
| 2019/0077510 | A1 | 3/2019 | Panas et al. |
| 2019/0079509 | A1 | 3/2019 | Bosworth |
| 2019/0193913 | A1 | 6/2019 | Takehara |
| 2019/0201642 | A1 | 7/2019 | Takehara |
| 2019/0341637 | A1* | 11/2019 | Fine .................. H01M 8/04089 |
| 2020/0088178 | A1 | 3/2020 | Fukudome et al. |
| 2020/0156790 | A1 | 5/2020 | Von Flotow et al. |
| 2020/0199727 | A1* | 6/2020 | Slocum ................. H01M 8/065 |
| 2020/0199728 | A1* | 6/2020 | Slocum ...................... C23C 2/02 |
| 2020/0262536 | A1 | 8/2020 | Deakin |
| 2020/0325045 | A1 | 10/2020 | Fukuoka |
| 2021/0011492 | A1 | 1/2021 | Raabe et al. |
| 2021/0061488 | A1* | 3/2021 | Smithers .................... B64F 3/02 |
| 2021/0080010 | A1 | 3/2021 | Klein |
| 2021/0115547 | A1* | 4/2021 | Slocum ..................... C23C 2/04 |
| 2021/0237843 | A1 | 8/2021 | Slocum et al. |
| 2021/0276865 | A1* | 9/2021 | Meroueh ................ B01J 8/0015 |
| 2021/0276866 | A1* | 9/2021 | Meroueh .................... B01J 8/00 |
| 2022/0041262 | A1* | 2/2022 | Slocum ..................... C01B 3/08 |
| 2022/0074023 | A1 | 3/2022 | Godart |
| 2023/0002026 | A1* | 1/2023 | Limpaecher .............. B64B 1/58 |
| 2023/0150701 | A1 | 5/2023 | Yartha et al. |
| 2023/0159149 | A1 | 5/2023 | Slocum et al. |

FOREIGN PATENT DOCUMENTS

| | | |
|---|---|---|
| CN | 103608957 A | 2/2014 |
| CN | 204034673 U | 12/2014 |
| CN | 104291268 A | 1/2015 |
| CN | 109678109 A | 4/2019 |
| CN | 113124170 A | 7/2021 |
| EP | 1975479 A2 | 10/2008 |
| EP | 2980352 A1 | 2/2016 |
| FR | 2914391 | 10/2008 |
| GB | 2226619 A | 7/1990 |
| GB | 2356184 A | 5/2001 |
| GB | 2525372 A | 10/2015 |
| JP | 2004174301 A | 6/2004 |
| JP | 2004243151 A | 9/2004 |
| JP | 2009221097 A | 10/2009 |
| RU | 2131841 C1 | 6/1999 |
| WO | 2009034479 A2 | 3/2009 |
| WO | 2011040942 A1 | 4/2011 |
| WO | 2015005921 A1 | 1/2015 |
| WO | 2015077225 A1 | 5/2015 |
| WO | 2016196718 A1 | 12/2016 |
| WO | 2021119628 A1 | 12/2016 |
| WO | 202134805 A1 | 2/2021 |

OTHER PUBLICATIONS

U.S. Patent and Trademark Office "Notice of Allowance" issued in related U.S. Appl. No. 16/804,676 dated Jan. 25, 2022 (25 pages). (NOA of Jan. 2022).

U.S. Patent and Trademark Office "Final Office Action" issued in related U.S. Appl. No. 17/134,757 dated Jun. 30, 2022 (16 pages). (FOA of Jun. 2022).

U.S. Patent and Trademark Office "Final Office Action" issued in related U.S. Appl. No. 17/134,757 dated Aug. 13, 2021 (11 pages). (FOA of Aug. 2021).

U.S. Patent and Trademark Office "Non-Final Office Action" issued in related U.S. Appl. No. 17/134,757 dated Apr. 1, 2021 (19 pages). (NFOA of Apr. 2021).

U.S. Patent and Trademark Office "Non-Final Office Action" issued in related U.S. Appl. No. 17/134,757 dated Nov. 26, 2021 (20 pages). (NFOA of Nov. 2021).

U.S. Patent and Trademark Office "Notice of Allowance" issued in related U.S. Appl. No. 17/014,593 dated Jan. 22, 2021 (19 pages). (NOA of Jan. 2021).

U.S. Patent and Trademark Office "Notice of Allowance" issued in related U.S. Appl. No. 17/014,593 dated Jun. 3, 2021 (15 pages). (NOA of Jun. 2021).

U.S. Patent and Trademark Office "Non-Final Office Action" issued in related U.S. Appl. No. 17/340,769 dated Aug. 11, 2021 (11 pages). (NFOA of Aug. 2021).

U.S. Patent and Trademark Office "Notice of Allowance" issued in related U.S. Appl. No. 17/475,320 dated Mar. 9, 2022 (24 pages). (NOA of Mar. 9, 2022).

Godart, Peter, "Design of an Aluminum-Powered Reverse Osmosis Desalination System for Disaster Relief," Jun. 2019.

Godart, Peter, "Mechanisms of Liquid-Metal-Activated Aluminum-Water Reactions and Their Application," Sep. 2021.

Meroueh, Laureen, "Effects of Doping and Microstructural Variables on Hydrogen Generated Via Aluminum-Water Reactions Enabled by a Liquid Metal," Ph.D. Thesis, Massachusetts Institute of Technology, Sep. 2020.

USPTO; Non Final Office Action in U.S. Appl. No. 17/865,201 dated Nov. 25, 2022; 15 pages.

Can Dimensions, Twin Monkeys Beverage Canning Systems, retrieved on Apr. 5, 2021, https://twinmonkeys.net/can-dimensions/ (3 pages).

Lee, Lieng-Huang (edited) Fundamentals of Adhesion, pp. 333-336 (1991).

Chao, et al., "Maximized On-Demand Hydrogen Generator Design," Adv. Mat. Res. vol. 690-693, pp. 954-961 (2013).

Ansara, I., et al. "Thermodynamic Analysis of the Ga—In, Al—Ga, Al—In and the Al—Ga—In Systems," Calphad, vol. 2, No. 3, pp. 187-196 (1978).

Choi, G., et al. "Mechanism of Hydrogen Generation via Water Reaction with Aluminum Alloys," Generating hydrogen on demand, Jun. 28, 2010 (4 pages).

Metals Handbook Tenth Edition, vol. 2, Properties and Selection: Nonferrous Alloys and Special-Purpose Materials, pp. 145-146 (Oct. 1990).

Parmuzina, A.F., et al., "Oxidation of Activated aluminum with water as a method for hydrogen generation," Russian Chemical Bulletin, International Edition, vol. 58, No. 3, pp. 493-989 (Mar. 2009).

(56) References Cited

OTHER PUBLICATIONS

Rajagopalan, M., et al., "Atomic-scale analysis of liquid-gallium embrittlement of aluminum grain boundaries," Acta Materialia, vol. 73, pp. 312-325 (Jul. 2014).
Vitos, L., et al. "Surface Energy of Metals," Elsevier Surface ScieWAN, et al. "Review of Solid State recycling of aluminum chips," Elsevier, Resources, Conservation & Recycling 125, pp. 37-47 (2017).nce 411, pp. 186-202, 1998.
Wan, B., et al. "Review of Solid State recyling of aluminum chips," Elsevier, Resources, Conservation & Recycling 125, pp. 37-47 (2017).
Wikipedia, "USS Macon (ZRS-5)," Feb. 24, 2023 (10 pages).
U.S. Patent and Trademark Office, "International Search Report and Written Opinion," issued in related International Patent Application No. PCT/US2016/035397 dated Sep. 7, 2016 (13 pages).
U.S. Patent and Trademark Office, "International Preliminary Report on Patentability," issued in related International Patent Application No. PCT/US2016/035397 dated Dec. 5, 2017 (11 pages).
European Patent Office, "Extended European Search Report," issued in related European Patent Application No. 16804381.8 dated Oct. 26, 2018 (7 pages).
U.S. Patent and Trademark Office, "Restriction Requirement," issued in related U.S. Appl. No. 17/014,593 dated Dec. 8, 2020 (7 pages).
U.S. Patent and Trademark Office, "Notice of Allowance and Issue Fee(s) Due," issued in related U.S. Appl. No. 17/535,008 dated Dec. 8, 2022 (30 pages).
U.S. Patent and Trademark Office, "Notice of Allowance and Issue Fee(s) Due," issued in related U.S. Appl. No. 17/535,008 dated Apr. 19, 2023 (14 pages).
U.S. Patent and Trademark Office, "Notice of Allowance and Issue Fee(s) Due," issued in related U.S. Appl. No. 17/535,008 dated Aug. 11, 2023 (17 pages).
U.S. Patent and Trademark Office, "Notice of Allowance and Issue Fee(s) Due," issued in related U.S. Appl. No. 17/535,008 dated Nov. 30, 2023 (14 pages).
U.S. Patent and Trademark Office, "Notice of Allowance and Issue Fee(s) Due," issued in related U.S. Appl. No. 17/586,759 dated May 24, 2023 (26 pages).
U.S. Patent and Trademark Office, "Notice of Allowance and Issue Fee(s) Due," issued in related U.S. Appl. No. 17/586,759 dated Sep. 6, 2023 (15 pages).
U.S. Patent and Trademark Office, "Notice of Allowance and Issue Fee(s) Due," issued in related U.S. Appl. No. 17/586,759 dated Jan. 24, 2024 (17 pages).
U.S. Patent and Trademark Office, "Restriction Requirement," issued in related U.S. Appl. No. 17/865,201 dated Sep. 12, 2022 (6 pages).
U.S. Patent and Trademark Office, "Non-final Office Action," issued in related U.S. Appl. No. 17/865,201 dated Jul. 3, 2023 (14 pages).
U.S. Patent and Trademark Office, "Final Office Action," issued in related U.S. Appl. No. 17/865,201 dated Jan. 24, 2024 (10 pages).
U.S. Patent and Trademark Office, "Advisory Action," issued in related U.S. Appl. No. 17/865,201 dated Apr. 22, 2024 (3 pages).
U.S. Patent and Trademark Office, "Non-final Office Action," issued in related U.S. Appl. No. 17/865,201 dated Aug. 26, 2024 (21 pages).
U.S. Patent and Trademark Office, "Notice of Allowance and Issue Fee(s) Due," issued in related U.S. Appl. No. 18/110,352 dated Mar. 13, 2024 (20 pages).
U.S. Patent and Trademark Office, "Notice of Allowance and Issue Fee(s) Due," issued in related U.S. Appl. No. 18/110,352 dated Jun. 20, 2024 (17 pages).

\* cited by examiner

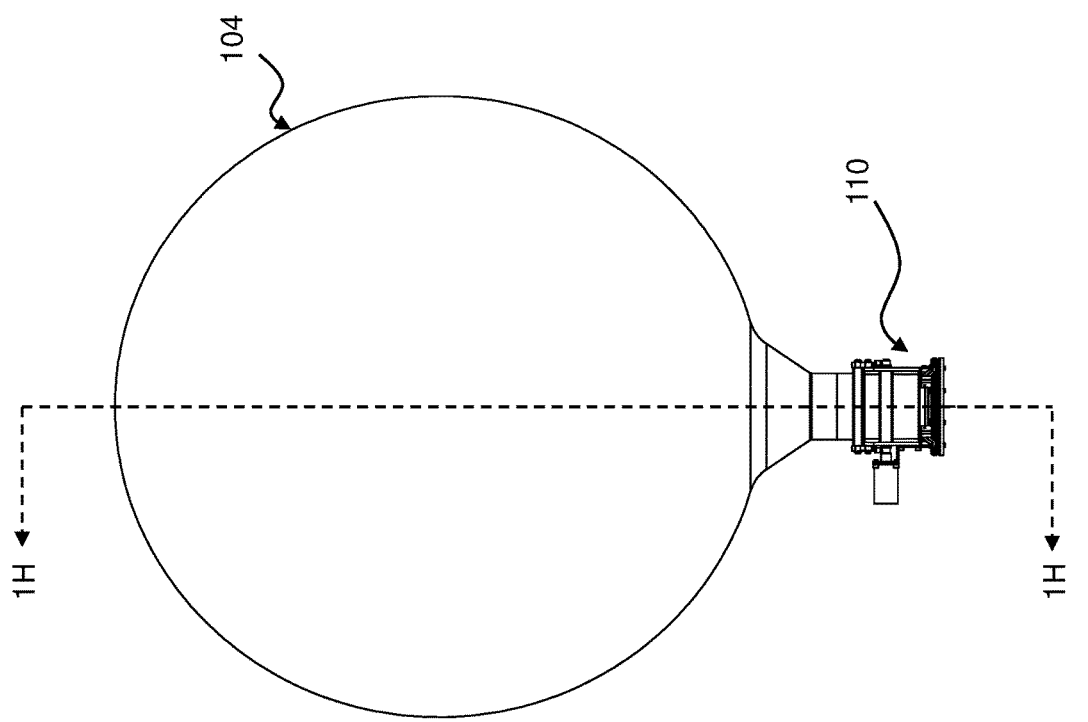

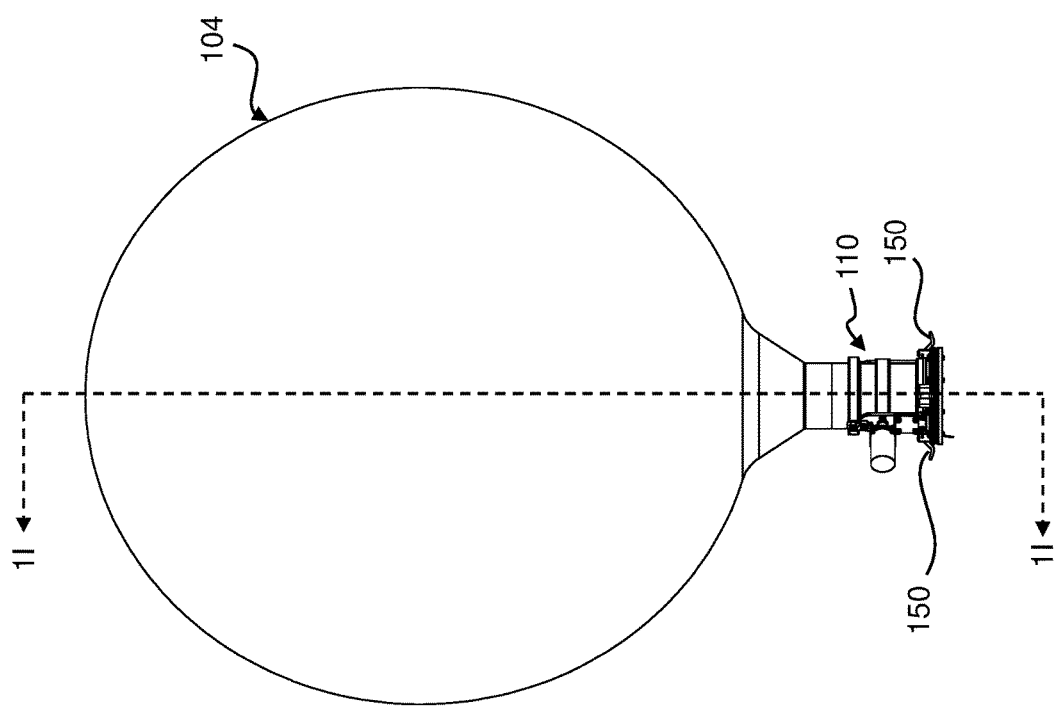

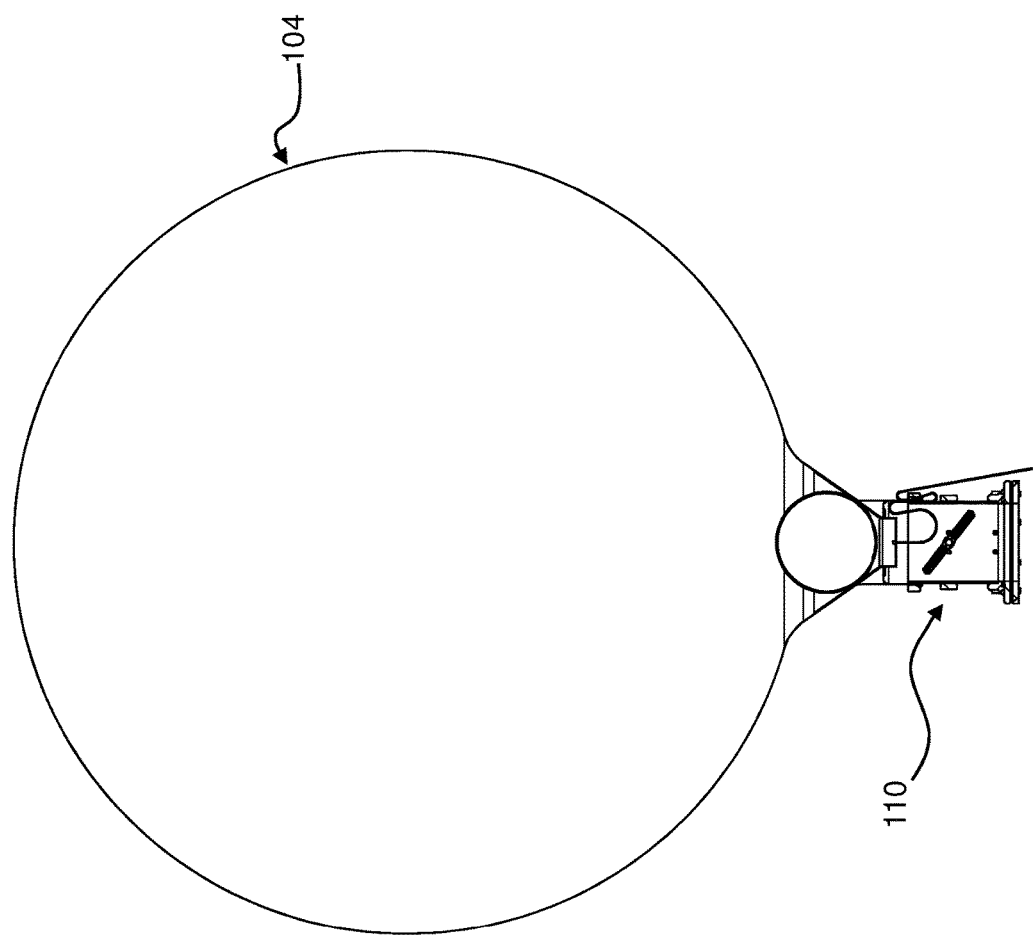

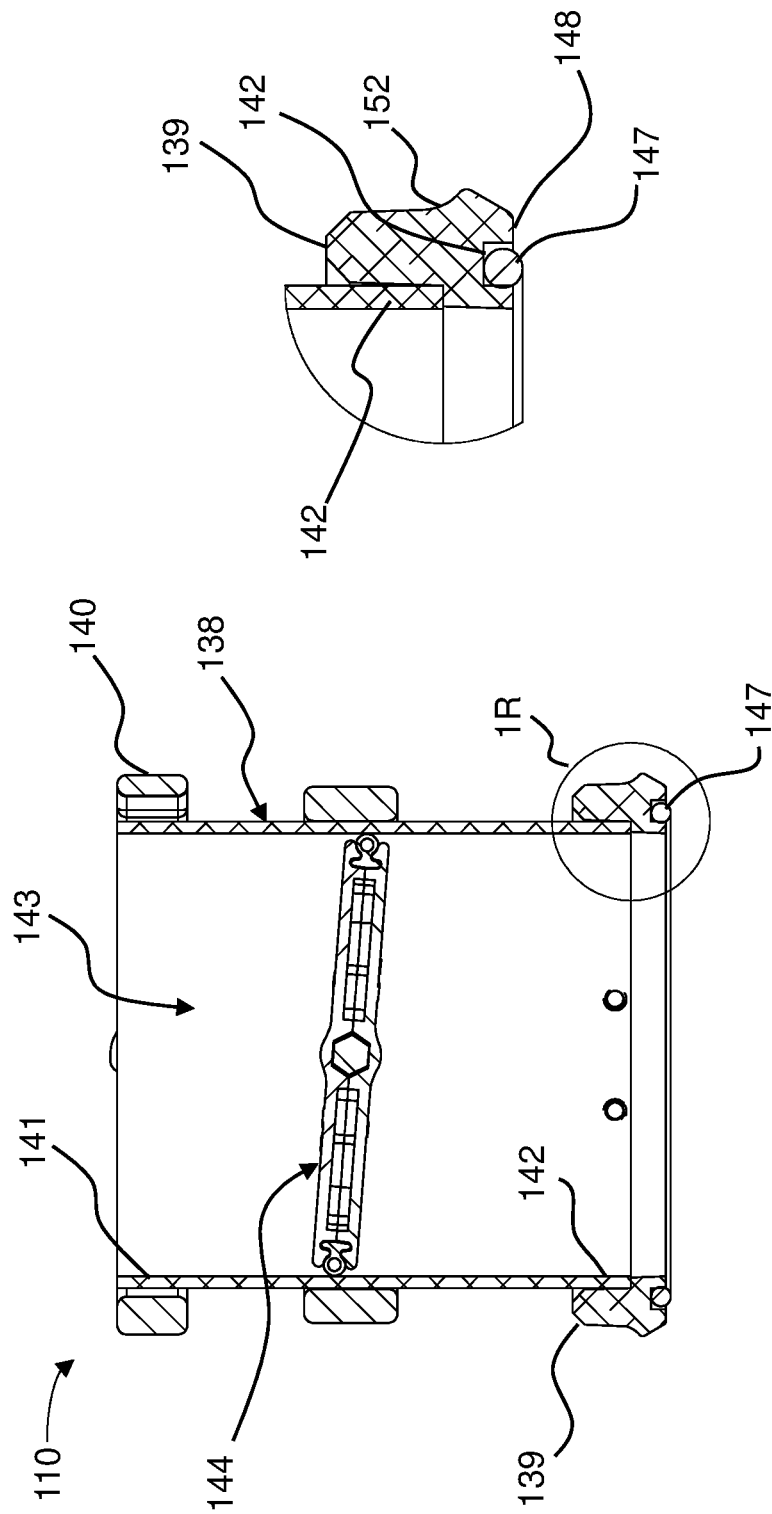

LIFTING GAS GENERATION

CROSS-REFERENCE TO RELATED APPLICATIONS

This application claims priority to U.S. Provisional Application 63/256,624, filed Oct. 17, 2021, the entire contents of which are hereby incorporated herein by reference.

GOVERNMENT LICENSE RIGHTS

This invention was made with government support under FA8702-15-D-0001 awarded by the United States Air Force. The government has certain rights in the invention.

BACKGROUND

Balloons can be filled with a lifting gas to allow the balloon to float in any one or more of various different media. As an example, balloons in the form of weather balloons are commonly used for meteorological observation. Such weather balloons provide localized weather conditions that may not be accurately measurable using ground-based measurements or satellite images.

The types of applications in which balloons are useful are, however, constrained by the resources and quality of lifting gases required to impart buoyancy to balloons. That is, the time and equipment required for inflation can make balloons unsuitable for many implementations in the field, away from established infrastructure. Further, the performance of balloons can be significantly impacted by composition of the lifting gas itself, including the presence of contaminants that can damage the balloon. For example, changes in lifting gas composition sourced in the field can result in suboptimal—or at least unpredictable—flight of the balloon.

Accordingly, there remains a need for making balloon inflation and flight more robust across a variety of field conditions, while using equipment and resources amenable to transport and rapid deployment.

SUMMARY

According to one aspect, a reactor for generating lifting gas may include a first port, a second port, a coupling releasably securable in fluid communication with an aerostat, and a tank including a base and a crown defining at least a portion of a chamber therebetween, the first port and the coupling each supported on the crown, the second port supported on the tank away from the crown, the chamber in fluid communication with each one of the first port, the second port, and the coupling, the chamber expandable between the crown and the base from an uninflated state to an inflated state and, with the tank in the inflated state, a maximum height of the chamber less than a maximum dimension of the base.

In certain implementations, the maximum dimension of the base may be a diagonal dimension and, in the inflated state, the maximum height of the chamber is less than about one-third of the maximum dimension of the base.

In some implementations, in the inflated state, the base may be rectangular, and a ratio of long to short sides is less than about 6:1.

In certain implementations, at least a portion of the tank may be flexible to unfold from a folded configuration as the chamber expands from the uninflated state to the inflated state.

In some implementations, the first port and the coupling may each define respective longitudinal axes intersecting the base, and the respective longitudinal axes of the first port and the coupling are non-intersecting within the chamber in the inflated state.

In some implementations, the coupling may include a body, a rim, and a yoke, the body has a first end portion and a second end portion and defines a passage therebetween, the passage is in fluid communication with the chamber, the rim is supported on the first end portion of the body, and the yoke is releasably supported on the second end portion of the body to decouple the aerostat from the tank. Additionally, or alternatively, the reactor may include a first plate and a second plate, wherein the rim of the coupling is supported on the tank with material of the tank disposed between the first plate and the second plate, the first plate is disposed in the chamber, the second plate is along an outer surface of the crown, and the rim of the coupling is releasably secured to the second plate, and the first plate and the second plate are attached to each other. Further, or instead, the reactor may include two or more locks supported on the second plate, wherein each of the two or more locks includes a respective cam, the rim includes a ridge circumscribing the passage, the respective cam of each of the two or more locks is rotatable into releasable engagement with the ridge of the rim with the passage of the coupling in fluid communication with the chamber of the tank. As an example, with the two or more locks releasably engaged with the ridge of the rim, the two or more locks may be circumferentially spaced apart from one another about a circumference of the ridge of the rim. Additionally, or alternatively, the reactor may include an O-ring, wherein the rim defines a groove along a surface of the rim facing the second plate, the O-ring is disposed in the groove with the surface of the rim facing the second plate.

In certain implementations, the reactor may additionally, or alternatively, include a valve supported in the first port, wherein the valve is biased in a closed position, and the valve is openable to introduce one or more reactants into the chamber from an environment outside of the chamber.

In some implementations, the reactor may additionally, or alternatively, include a support extending from the coupling into the chamber wherein, with the chamber in the uninflated state, the support spaces at least a portion of the crown from the base. As an example, at least a portion of the support extending into the chamber may define a plurality of orifices. Further, or instead, the support may include a cap section, and the cap section having a rounded surface positionable in contact with the base within the chamber.

In certain implementations, the reactor may further, or instead, include a divider disposed in the chamber and separating the chamber into a first section and a second section, wherein the divider defines at least one aperture through which the first section and the second section of the chamber are in fluid communication with one another. As an example, the first port may be in fluid communication with the coupling via the plurality of apertures of the divider. In some instances, the divider may include at least one flap, each flap is disposed in a corresponding aperture and movable in response to pressure of reaction products moving in a direction from the first section toward the second section of the chamber. Additionally, or alternatively, the divider may extend from the base to the crown in the chamber, and the divider is flexible as the chamber expands from the uninflated state to the inflated state. Further, or instead, with the chamber in the inflated state, the divider may span the maximum dimension of the base.

In some implementations, the reactor may additionally, or alternatively, include one or more handles supported on an outer surface of the tank.

BRIEF DESCRIPTION OF THE FIGURES

FIG. 1F is a side view of a portion of the system of FIG. 1A, shown with the tank and the support structure of the reactor removed.

FIG. 1G is a side view of the portion of the system shown in FIG. 1F, with the portion of the system shown rotated relative to the side view shown in FIG. 1F.

FIG. 1H is a side, cross-sectional view of the portion of the system shown in FIG. 1F, with the cross-section taken along section 1H-1H in FIG. 1F.

FIG. 1O is a perspective view of the coupling of FIG. 1A.

FIG. 1Q is a side cross-sectional view of the coupling of FIG. 1A, with the cross-section taken along section 1Q-1Q in FIG. 1P.

FIG. 1R is a side, cross-sectional view of the coupling along the area of detail 1R in FIG. 1Q.

Like reference symbols in the various drawings indicate like elements.

DETAILED DESCRIPTION

Figure 1A:
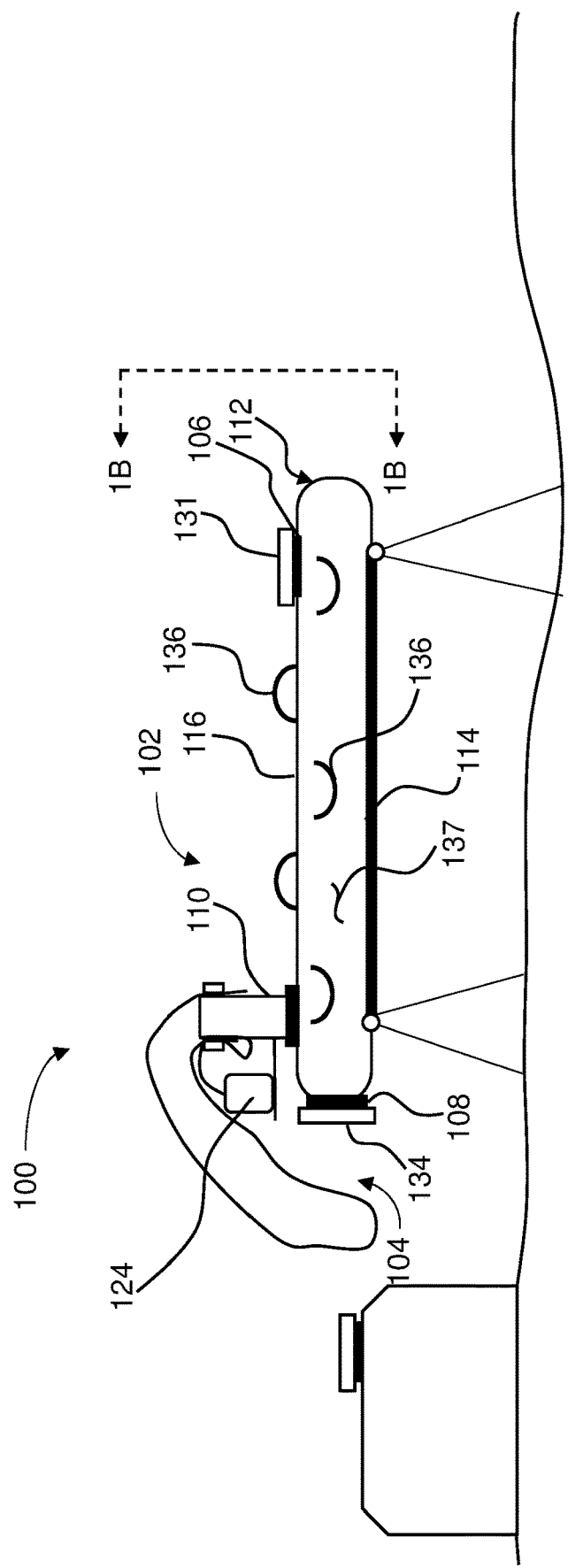
FIG. 1A is a schematic representation of a system for launching an aerostat, the system including a reactor and the aerostat, with the reactor shown in an uninflated state.

The embodiments will now be described more fully hereinafter with reference to the accompanying figures, in which exemplary embodiments are shown. The foregoing may, however, be embodied in many different forms and should not be construed as limited to the exemplary embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

As used herein, the term "gas" or variants thereof (e.g., lifting gas) shall be understood to include a single component or multiple components (mixed), unless otherwise specified or made clear from the context. Further, unless a contrary intent is indicated, the use of the term gas shall be generally understood to include any multi-phase mixture that includes one or more gas phase components and exhibits characteristics of a compressible fluid, with a relationship between pressure, volume, and temperature that is accurately characterized by the ideal gas law to within about ±5 percent at room temperature at sea level. Thus, for example, a gas may include at least one gas phase component, as well as some amount of one or more vapor components (e.g., water vapor).

For the sake of clear and efficient description, elements with numbers having the same last two digits in the disclosure that follows shall be understood to be analogous to or interchangeable with one another, unless otherwise explicitly made clear from the context, and, therefore, are not described separately from one another, except to note differences or to emphasize certain features. Thus, for example, a reactor 102, a first reactor 202a, a second reactor 202b, a reactor 302, and a reactor 402 shall be understood to be analogous to or interchangeable with one another, unless otherwise specified or made clear from the context.

Figure 1B:
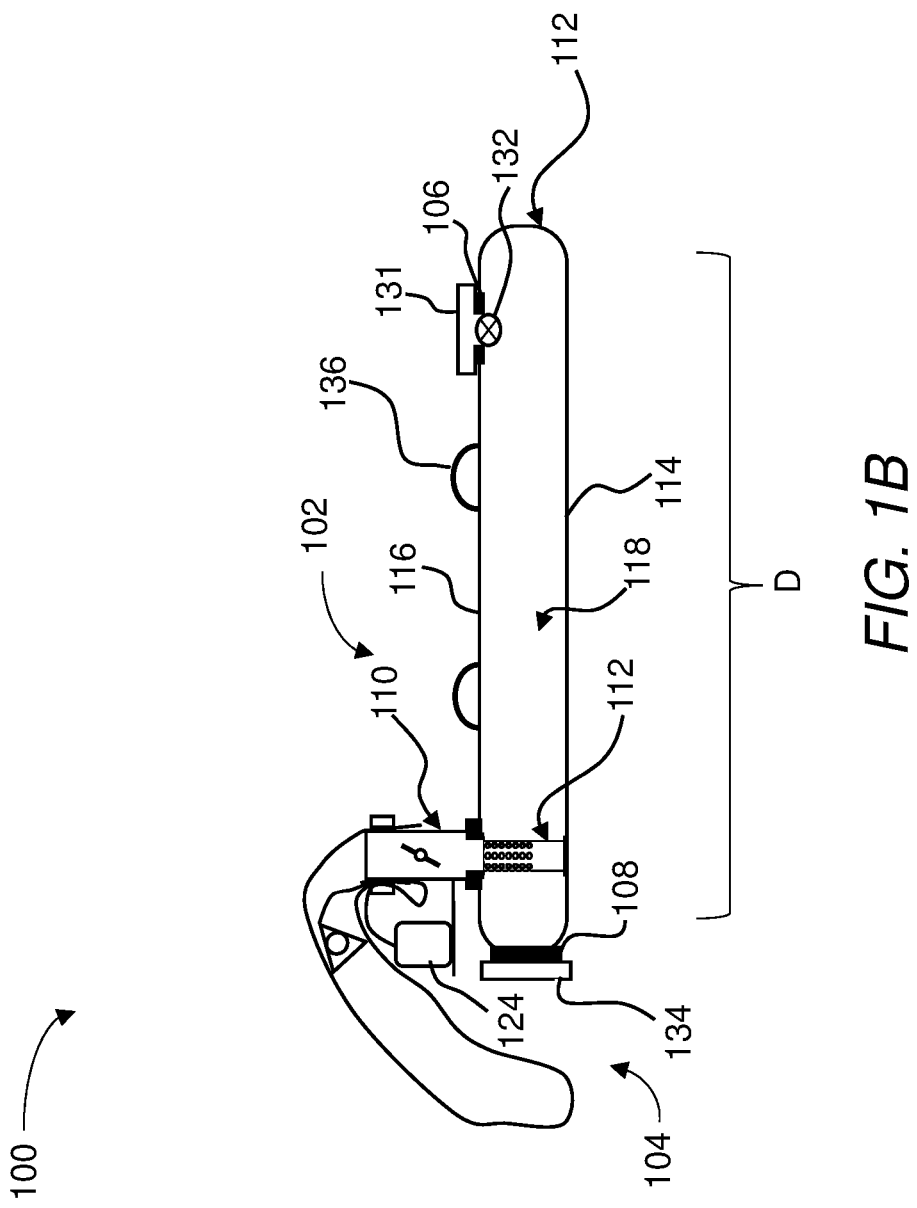
FIG. 1B is a schematic representation of the system of FIG. 1A, with the reactor shown in the uninflated state and shown along a cross-section taken along section 1B-1B in FIG. 1A.
Figure 1C:
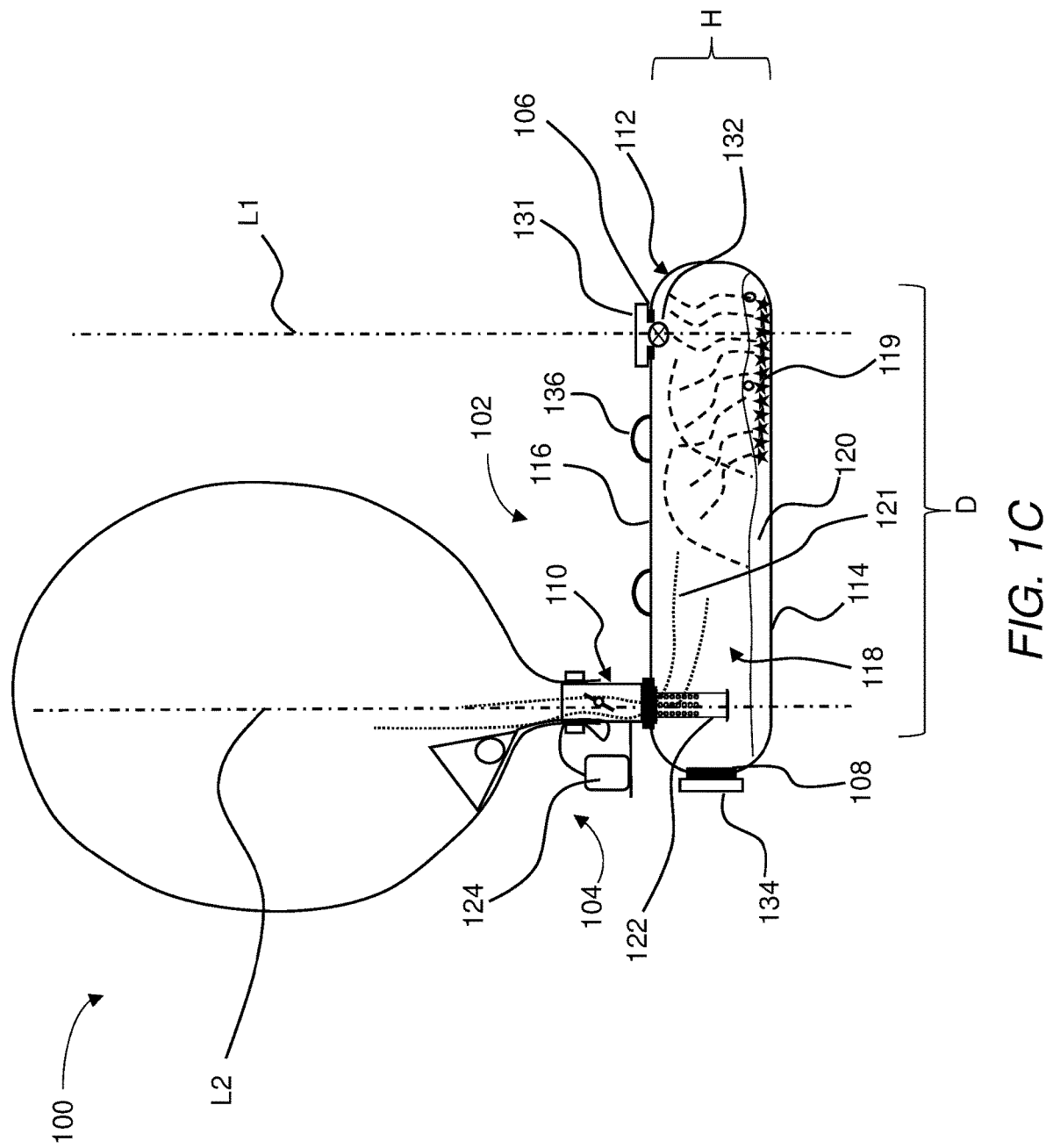
FIG. 1C a schematic representation of a side, cross-sectional view the system of FIG. 1A, with the reactor shown in an inflated state and the cross-section taken along section 1B-1B in FIG. 1A.

Referring now to FIGS. 1A-1C, a system 100 for launching a lighter-than-air aircraft may include a reactor 102 and an aerostat 104. The reactor 102 may include a first port 106, a second port 108, a coupling 110, and a tank 112. The coupling 110 of the reactor 102 may be releasably securable in fluid communication with the aerostat 104. The tank 112 may include a base 114 and a crown 116 defining at least a portion of a chamber 118 therebetween. The first port 106 and the coupling 110 may be supported on the crown 116 of the tank 112 and, additionally, or alternatively, the second port 108 may be supported on the tank 112 away from the crown 116. The chamber 118 of the tank 112 may be in fluid communication with each one of the first port 106, the second port 108, and the coupling 110. Additionally, or alternatively, the chamber 118 may be expandable between the crown 116 and the base 114 from an uninflated state to an inflated state. Among other things, such expandability of the chamber 118 may balance competing considerations associated with transporting the reactor 102 to remote locations in the field while also accommodating collection of rapidly produced lifting gas (e.g., hydrogen-containing lifting gas formed through reaction of activated aluminum with water). For example, the reactor 102 may be stored and transported in a compact form factor associated with the chamber 118 in the uninflated state, while expandability of the chamber 118 from the uninflated state to the inflated state may facilitate producing a large amount of low-pressure, lifting gas in the chamber 118 such that the lifting gas may be safely transferred to the aerostat 104 at a launch site. Further, with the chamber 118 in the inflated state, a maximum height H of the chamber 118 may be less than a maximum dimension D of the base 114 of the tank 112. Stated differently, with the chamber 118 in the inflated state, the tank 112 may have a squat form factor—namely, a form factor that is low to the ground and marked by disproportionate shortness compared to a maximum dimension of the tank 112.

As compared to a rigid chamber or a chamber having a different shape, the expandability of the chamber 118 of the tank 112 to a squat form factor may advantageously facilitate rapid production of lifting gas in the chamber 118 with coordinated rapid inflation and launch of the aerostat 104 at remote launch sites in the field. For example, in use, as described in greater detail below, activated aluminum 119 may be reacted with water 120 in the chamber 118 of the tank 112 to produce a lifting gas 121. The activated aluminum 119 may include activated aluminum, such as set forth in U.S. Pat. No. 10,745,789, issued to Jonathan Thurston Slocum on Aug. 18, 2020, and entitled "Activated Aluminum Fuel," the entire contents of which are hereby incorporated herein by reference. The expandability of the chamber 118 to the inflated state having a squat form factor in which the maximum dimension D of the base is greater than the maximum height H of the chamber 118 may facilitate spreading the reaction of the activated aluminum 119 and water 120 over a wide area along the base 114 in the chamber 118. As an example, this may be useful for reducing excess frothing of the reaction which, in turn, may reduce the likelihood of reaction products escaping from the chamber 118 during the reaction. Further, or instead, as the reaction of the activated aluminum 119 and water 120 progresses in the chamber 118, reaction products may hit a portion of the crown 116 away from the coupling 110—and, thus, away from the aerostat 104—such that the expandability of the chamber 118 from the uninflated state to the squat form factor of the inflated state may acts as an energy dissipator for quenching ejecta eruptions from the frothing and reaction bubbles associated with rapid reaction of the activated aluminum 119 and water 120. Such energy dissipation in the chamber 118 may make it less likely that unwanted contaminants will be carried with the lifting gas 121 moving into the aerostat 104.

In general, the tank 112 may have an overall shape that facilitates reliable expandability of the chamber 118 from the uninflated state to the squat form factor associated with the inflated state under a variety of field conditions. Further, or instead, with the chamber 118 in the uninflated state, the tank 112 may have an overall shape that is easily carried by personnel to a remote location for launching the aerostat 104 in the field. Additionally, or alternatively, the tank 112 may have an overall shape that may be amenable to cost-effective manufacturing, even in small quantities. In certain implementations, the tank 112 may have a rated liquid capacity greater than is required for the reactants to be reacted in the chamber 118. For example, in instances in which the reactants include the activated aluminum 119 and water 120, the rated liquid capacity of the tank 112 may be at least twice the amount of water 120 used for the reaction with the activated aluminum 119 to provide enough empty space above the reactants to quench the ejecta burbling.

In certain implementations, the base 114 and the crown 116 may be directly coupled to one another. For example, an interface (e.g., seam) between the base 114 and the crown 116 forms at least a portion of a perimeter of the chamber 118. As a more specific example, the base 114 and the crown 116 may be directly coupled to one another such that, with the chamber 118 in the inflated state, the tank 112 has a pillow-like shape. Among other things, such direct coupling between the base 114 and the crown 116 may be useful for achieving weight savings in fabrication of the tank 112, thus facilitating transportability of the tank 112 by personnel in the field. Further, or instead, as compared to the use of intermediate materials, direct coupling between the base 114 and the crown 116 may reduce the number of potential failure modes of the tank 112 in the field, making the tank 112 both more robust and easier to repair.

The maximum dimension D of the base 114 may generally be any measure in one direction, along the base 114, with the chamber 118 in the inflated state. Thus, for example, the maximum dimension D of the base 114 may be a diagonal dimension extending across the base 114 (e.g., a dimension extending through a geometric center of the base 114 for some shapes, such as instances in which the base 114 is circular along the chamber 118). Continuing with this example, the maximum height H of the chamber 118, in the inflated state, may be less than about one-third of the diagonal dimension corresponding to the maximum dimension D of the base 114. Such a ratio between the diagonal dimension and the maximum height H of the chamber 118 has been experimentally found to be useful for facilitating dampening of the reaction of the activated aluminum 119 and water 120 by the crown 116 while also facilitating removal of contaminants from the lifting gas flowing from the site of the reaction in the chamber 118 to the coupling 110 along the diagonal dimension of the base 114.

In certain implementations, with the chamber 118 in the inflated state, the base 114 may be quadrilateral, as may be useful for facilitating more efficient use of material as compared to forming a base as a more rounded shape such as a circle or oval. Thus, for example, with the chamber 118 in the inflated state, the base 114 may be rectangular. As used in this context, unless otherwise specified or made clear from the context, the term rectangular shall be understood to include shapes that are geometrically rectangular—namely, a quadrilateral with right angles and inclusive of a square—as well as shapes that deviate slightly from a geometrically ideal rectangle due to manufacturing tolerances and/or deliberate rounding of corners (as may be useful for reducing force concentration along a portion of the chamber 118 corresponding to sharp corners of the base 114). As an example, with the chamber 118 in the inflated state, the base 114 may be rectangular, and a ratio of long to short sides may be less than about 6:1 (and greater than 1:1 in instances in which it is desirable to exclude a square), with uncertainty in the nominal ratio reflecting variation attributable to manufacturing tolerance. While larger ratios of long to short sides of rectangles may be used for the base 114, such longer ratios may be associated with longer residence times of the lifting gas 121 in the chamber 118 which, in turn, may limit the rate of inflation of the aerostat 104. Thus, stated differently, the base 114 formed as rectangular with a ratio of long to short sides less than about 6:1 with the chamber 118 in the inflated state may be useful for balancing competing considerations of allowing contaminants to dropout of the lifting gas 121 before moving into the aerostat 104 via the coupling 110 while also facilitating rapid inflation of the aerostat 104 in the field.

In certain implementations, the tank 112 itself may be flexible to unfold from a folded configuration as the chamber 118 expands from the uninflated state to the inflated state under pressure of the lifting gas 121 forming in the chamber 118. That is, the tank 112 may be in a folded configuration (e.g., folded onto itself along one or more creases, rolled onto itself, or otherwise compacted) to facilitate storage and/or transport of the tank 112. At or near the time launch site of the aerostat 104, the activated aluminum 119 and water 120 may be combined in the chamber 118 with the tank 112 at least partially folded. Continuing with this example, as lifting gas 121 is produced and pressure in the chamber 118 expands the chamber 118 from the uninflated state to the inflated state, the tank 112 may unfold from the folded configuration to the unfolded configuration such that the chamber 118 may expand to its fullest extent to facilitate dampening of the reaction and removal of contaminants from the lifting gas 121 produced in the chamber 118.

In general, the chamber 118 may be expandable from the uninflated state to the inflated state according to any type of movement of the base 114 and the crown 116 relative to one another. For example, in some instances, the base 114 and the crown 116 may each be flexible relative to one another without either the base 114 or the crown 116 being resilient, as may be useful for dampening ejecta. That is, while being flexible relative to on another, the base 114 and the crown 116 do not absorb energy when elastically deformed and, thus, do not release such energy upon unloading. As an example, one or both of the base 114 or the crown 116 may be at least partially formed of ethylene propylene diene mono rubber (EPDM) or other similar polymers.

Further, or instead, the base 114 may be less flexible than the crown 116 to facilitate handling the tank 112, such as dragging the tank 112 across rough ground for use in the field. For example, the base 114 may be thicker than the crown 116 to provide resistance against puncture or tearing as the tank 112 is handled under uncontrolled conditions. Further, or instead, as compared to the crown 116, the base 114 may include one or more additional materials that provide structural strength to the base 114 to facilitate resisting damage to the base 114.

Figure 1E:
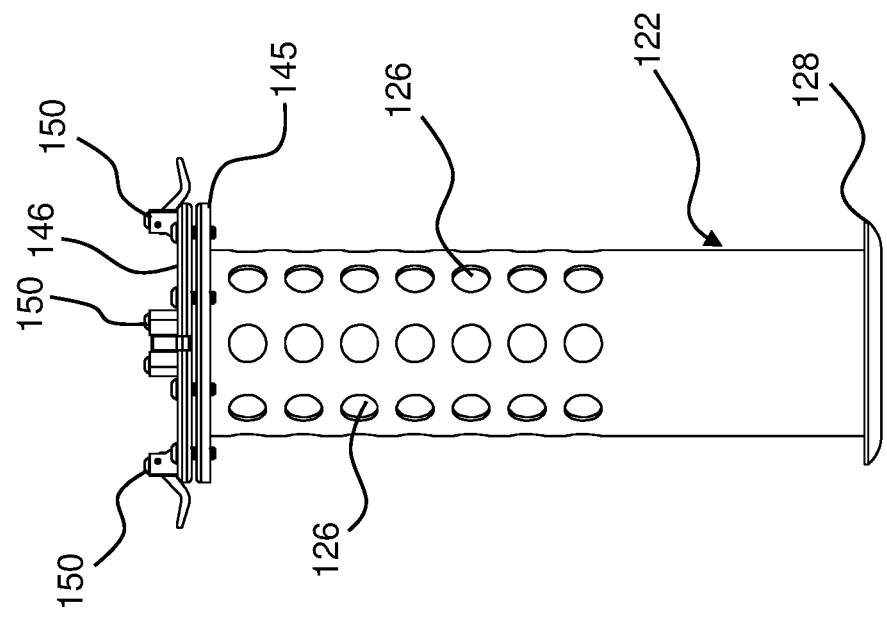
FIG. 1E is a side view of the support structure of FIG. 1D.
Figure 1D:
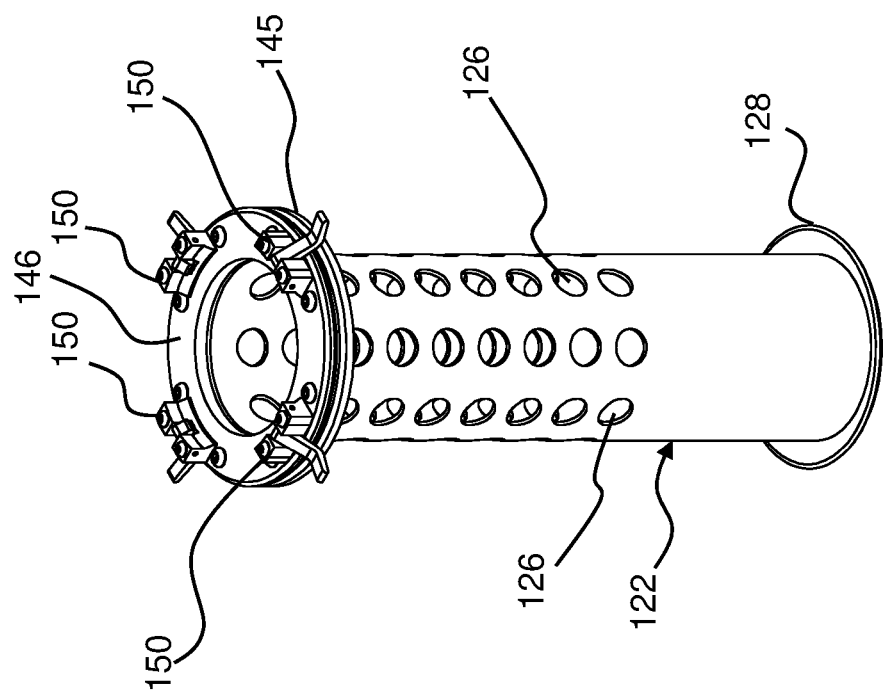
FIG. 1D is a perspective view of a support structure of the reactor of the system of FIG. 1A.
Figure 1I:
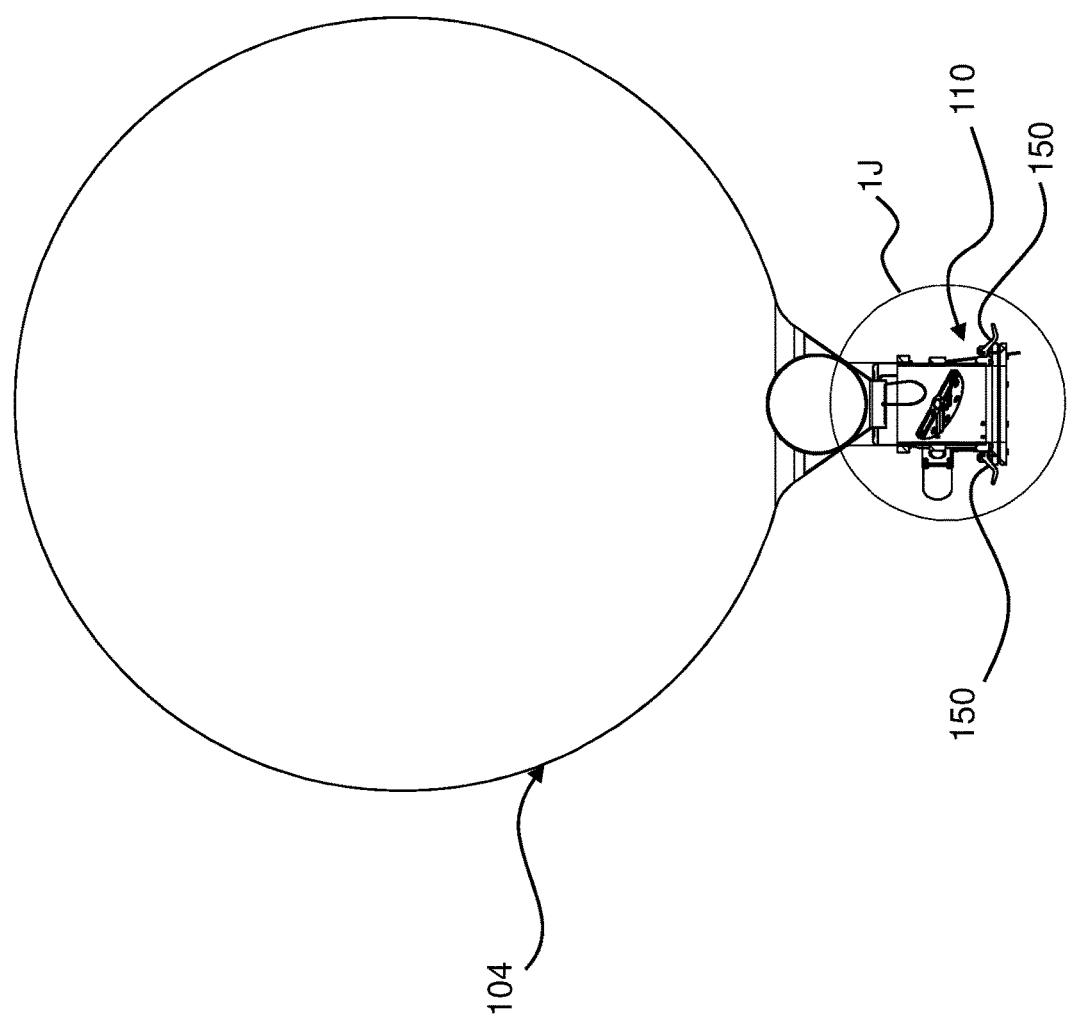
FIG. 1I is a side, cross-sectional view of the portion of the system shown in FIG. 1G, with the cross-section taken along section 1I-1I in FIG. 1G.
Figure 1J:
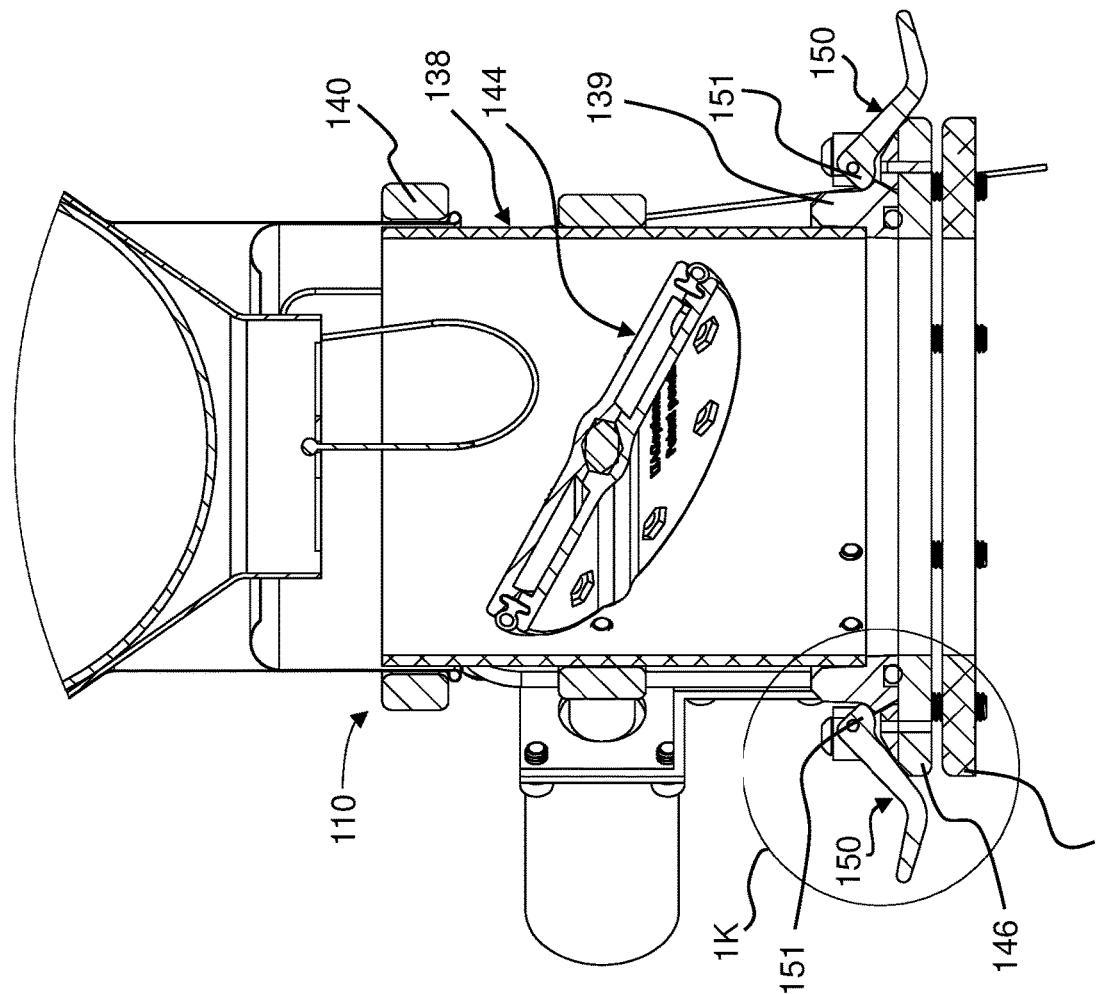
FIG. 1J is a side, cross-sectional view of the portion of the system shown in FIG. 1I, shown along the area of detail 1J in FIG. 1I.
Figure 1K:
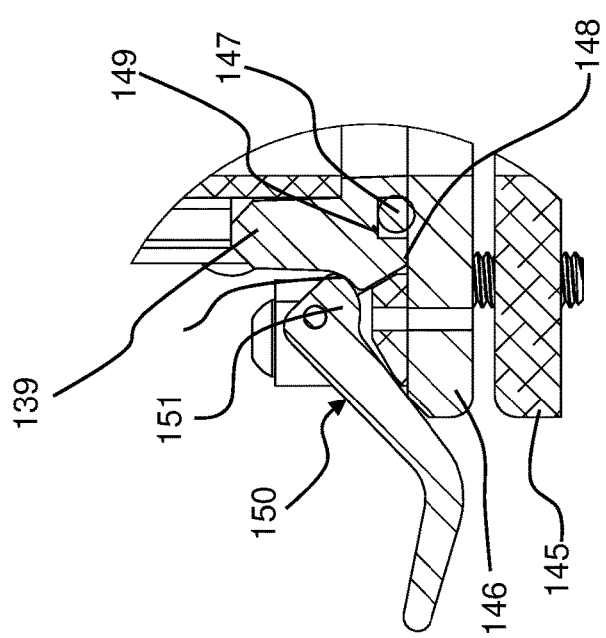
FIG. 1K is a side, cross-sectional view of the portion of the system shown in FIG. 1J, shown along the area of detail 1K in FIG. 1J.
Figure 1N:
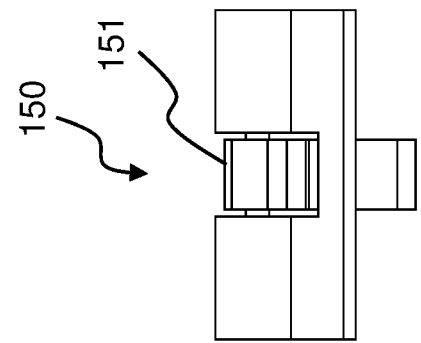
FIG. 1N is a front view of the lock of FIG. 1N.
Figure 1L:
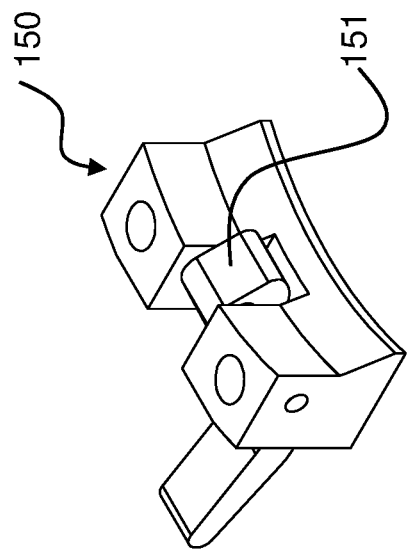
FIG. 1L is a perspective view of a lock of the system of FIG. 1A.
Figure 1M:
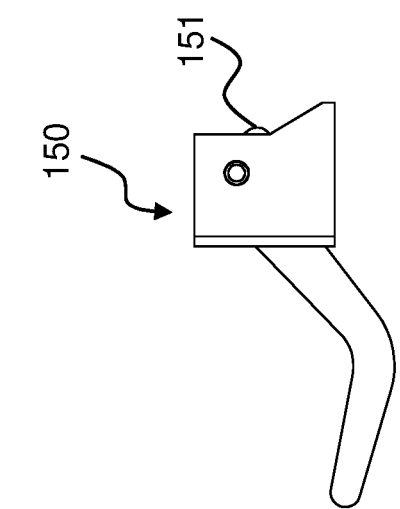
FIG. 1M is a side view of the lock of FIG. 1L.
Figure 10:
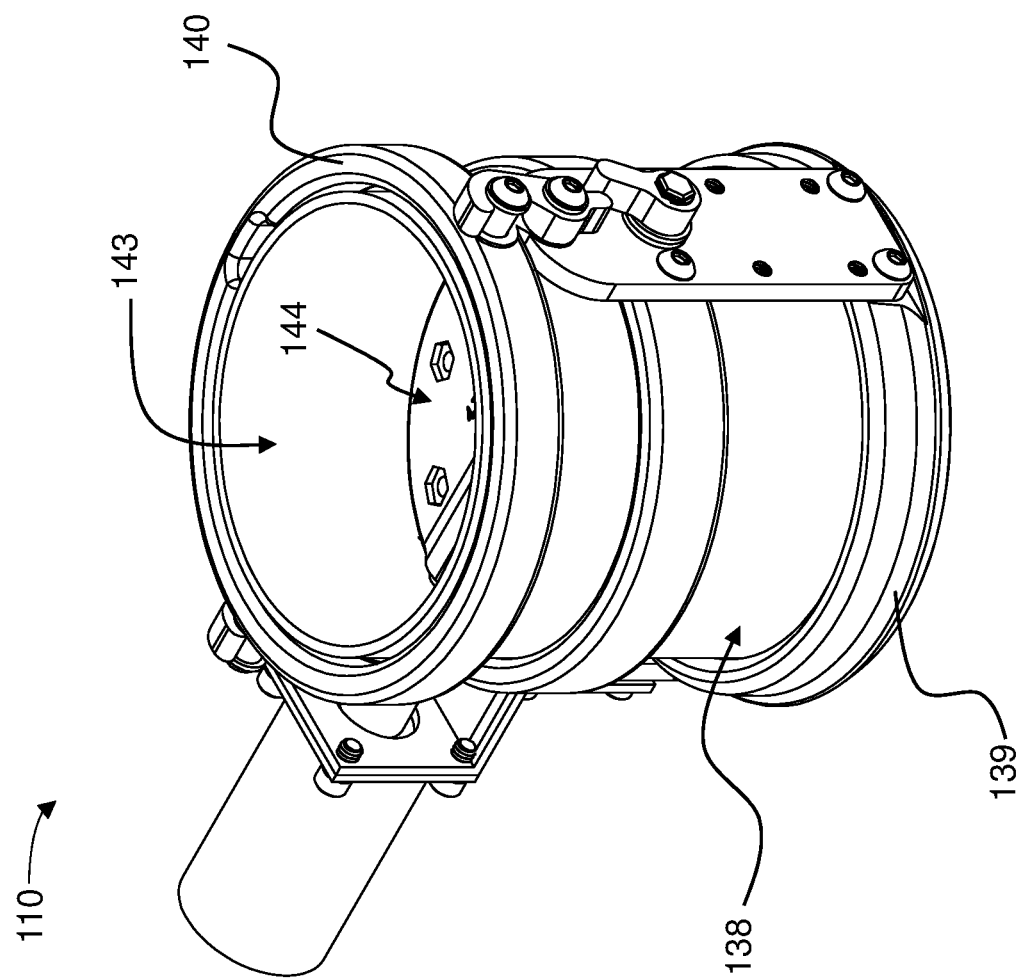
Figure 1P:
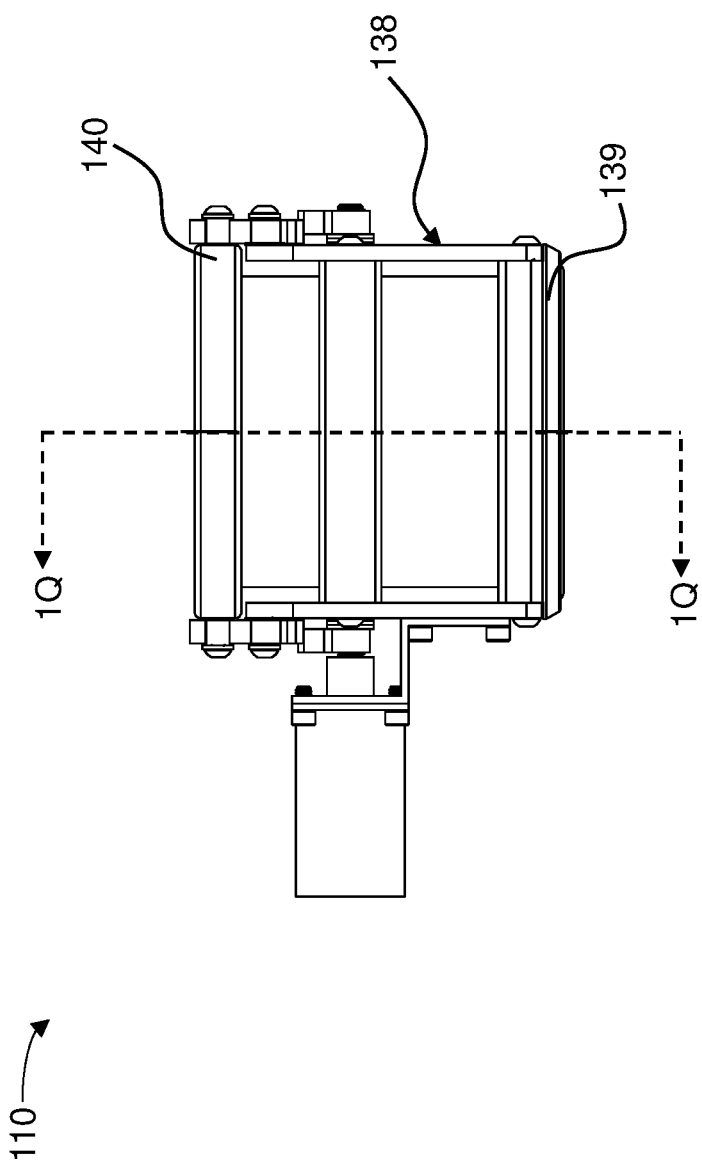
FIG. 1P is a side view of the coupling of FIG. 1A.

Referring now to FIGS. 1C, 1D, and 1E, the reactor 102 may additionally, or alternatively, include a support 122 extending from the coupling 110 into the chamber 118 of the tank 112 such that, with the chamber 118 in the uninflated state, the support 122 may space at least a portion of the crown 116 from the base 114. More specifically, the support 122 may maintain spacing between the crown 116 from the base 114 at least locally in the vicinity of the coupling 110 to keep the coupling 110 above the level of water 120 in the chamber 118, as is useful for reducing the likelihood that bubbling ejecta in the chamber 118 (e.g., during initial reaction stages) may pass into the aerostat 104 via the coupling 110. For example, with additional weight of the aerostat 104 and a payload 124 associated with the aerostat 104, the support 122 may resist sagging of the crown 116 in the vicinity of the coupling 110. While the support 122 may be advantageously disposed in the chamber 118 to reduce the likelihood of entanglement with the aerostat 104, it shall be appreciated that the support 122 may additionally or alternatively be at least partially disposed outside of the chamber 118 to maintain spacing between the crown 116 and the base in the vicinity of the coupling 110. For example, in some cases, the support 122 may include an external tripod or leg system coupled to the crown 116 to hold the crown 116 (and, thus, the coupling 110) above the level of water 120 in the chamber 118.

In certain implementations, the support 122 may additionally, or alternatively, facilitate filtering contaminants (e.g., solid particles) from the lifting gas 121 as the lifting gas 121 moves from the chamber 118 and into the coupling 110. For example, the support 122 may define a plurality of orifices 126 in fluid communication with the coupling 110. The plurality of orifices 126 may impart turbulence (e.g., swirl) to the lifting gas 121 as the lifting gas 121 moves into the coupling 110 via the plurality of orifices 126 of the support 122. As compared to less turbulent flow, the increased turbulence imparted to the lifting gas 121 moving through the plurality of orifices 126 may increase the amount of solid particles removed from the lifting gas 121 before the lifting gas 121 enters the coupling 110 and, ultimately, the aerostat 104. Further, as compared to the use of a filter material to remove particulates from the lifting gas 121, the use of the plurality of orifices 126 to generate local turbulence in the flow of the lifting gas 121 may be less likely to cause the chamber 118 to fail as a result of a buildup of excessive pressure in the chamber 118.

In certain implementations, the support 122 may include a cap section 128 having rounded surfaces positionable in contact with the base within the chamber. As compared to non-rounded surfaces, the rounded surfaces of the cap section 128 to reduce the likelihood of the support 122 snagging or tearing the base 114 of the tank 112. In certain instances, the cap section 128 may be movable relative to the base 114 within the chamber 118, as may be useful for reducing the likelihood of tearing along the base 114 resulting from over constraint of the support 122 within the chamber 118. For example, the cap section 128 freely movable relative to the base 114 may reduce the likelihood of tearing the tank 112 in instances in which the tank is folded prior to or between uses.

In general, the first port 106 may be used for introducing reactants into the chamber 118 and, specifically, along a portion of the chamber 118 spaced away from the coupling 110. That is, with the first port 106 facing up and in the same direction of inflation of the aerostat 104, the activated aluminum 119 introduced into the first port 106 may fall under the force of gravity to a portion of the chamber 118 below the first port 106, while water 120 in the chamber 118 may be nominally evenly distributed along the base 114 in the chamber 118 in instances in which the tank 112 is supported on a flat surface, although it may be acceptable for the tank 112 to be tilted slightly such that the first port 106 is lower than the coupling 110 such that water 120 in the chamber 118 tends to be along the portion of the chamber 118 below the first port 106. With the first port 106 spaced away from the coupling 110 along the crown 116, the portion of the chamber 118 that receive the reactants below the first port 106 is spaced away from the coupling such that, as the reaction of reactants like the activated aluminum 119 and water 120 proceeds, ejecta may impact the portion of the crown 116 between the first port 106 and the coupling 110, falling out of the lifting gas 121 and collecting along the base 114 in the chamber 118 prior to reaching the coupling 110.

In certain implementations, the relative spacing and/or orientation of the first port 106 relative to the coupling 110 may advantageously require the lifting gas 121 produced from the activated aluminum 119 and water 120 to flow along a nonlinear path in the chamber 118, as is useful for causing particles to drop out of the lifting gas 121 before the lifting gas 121 exits the chamber 118 via the coupling 110. As an example, the first port 106 may define a first longitudinal axis L1 and the coupling 110 may define a second longitudinal axis L2, with the first longitudinal axis L1 non-intersecting with the second longitudinal axis L2 within the chamber 118. Thus, as the activated aluminum 119 is introduced into the chamber 118 through the first port 106, the activated aluminum 119 may generally settle along the base 114 in the vicinity of the intersection of the first longitudinal axis L1 and the base 114. To the extent the second longitudinal axis L2 is non-intersecting with the first longitudinal axis L1 within the chamber 118, the lifting gas 121 produced from water 120 reacting with the activated aluminum 119 in the vicinity of the first longitudinal axis L1 increases the likelihood that the lifting gas 121 moves along a nonlinear path to exit the chamber 118 approximately along the second longitudinal axis L2 defined by the coupling 110.

In some instances, the reactor 102 may include a first lid 131 positionable on the first port 106 to reduce the likelihood of unintended material entering the chamber 118 prior to or during use. The first lid 131 may be manually removable from the first port 106 prior to introduction of water 120 and/or the activated aluminum 119 into the chamber 118 via the first port 106. Additionally, or alternatively, the first lid 131 may be repositionable on the first port 106 following combination of the activated aluminum 119 and water 120 in the chamber 118 to seal the first port 106, thus reducing the likelihood of unintended escape of the lifting gas 121 from the chamber 118 via the first port 106.

Further, or instead, the reactor 102 may include a valve 132 supported in the first port 106 and biased in a closed position in the first port 106. For example, the valve 132 may be a ball valve. The valve 132 may be openable to introduce one or more of the activated aluminum 119 and water 120 into the chamber from an environment (e.g., a container) outside of the chamber 118. Continuing with this example, the bias of the valve 132 toward the closed position may be useful for reducing the likelihood that ejecta from the vigorous first moments of reaction between the activated aluminum 119 and water 120 may exit the chamber 118 via the first port 106 before personnel have an opportunity to move away from the first port 106.

In general, the second port 108 may be advantageously positioned away from the coupling 110 and the first port 106 to facilitate using the second port 108 to clean out the chamber 118 between uses. That is, while the first port 106 may be disposed along the crown 116 to facilitate introduction of reactants into the chamber 118 under the force of gravity and the coupling 110 may be disposed along the crown 116 to facilitate collecting the lifting gas 121 produced in the chamber 118, the second port 108 may be disposed along a portion of the tank 112 closer to the base 114 to facilitate removing reaction products that have collected along the base 114 in the chamber 118 following use of the reactor 102. For example, with the second port 108 supported on the tank 112 away from the coupling 110 and the first port 106, the reaction products may be removed from the chamber 118 with little or no potential for unintentionally clogging the coupling 110 and/or the first port 106.

In certain implementations, the reactor 102 may include a second lid 134 releasably positionable on the second port 108. As reactants react with one another in the chamber 118, the second lid 134 may be secured in place on the second port 108 to reduce the likelihood of unintended escape of the lifting gas 121 from the chamber 118 through the second port 108. Once the reaction within the chamber 118 is complete and the aerostat 104 has been successfully separated from the reactor 102, the second lid 134 may be removed from the second port 108 and the chamber 118 emptied of reaction products prior to the next use of the reactor 102.

Given that the reactor 102 is generally intended to be portable and manually operable by personnel in remote locations, the reactor 102 may further, or instead, include one or more handles 136 supported on an outer surface supported on an outer surface 137 of the tank 112. For example, the one or more handles 136 may be positioned along sides and/or along the top of the tank 112. As may be appreciated, the one or more handles 136 may be useful for facilitating manually moving the reactor 102 into place prior to use and/or manually moving the reactor 102 (laden with reaction products) following use.

Referring now to FIGS. 1B-1R, the coupling 110 may include any one or more of the various different features of couplings described in U.S. patent application Ser. No. 17/891,108, filed Aug. 18, 2022, and entitled "BUOYANT TENSIONING FOR AEROSTAT LIFTING," the entire contents of which are incorporated herein by reference. As an example, the coupling 110 may include a body 138, a rim 139, and a yoke 140. The body 138 may have a first end portion 141 and a second end portion 142, and the body 138 may define a passage 143 therebetween. The passage 143 of the body 138 of the coupling 110 may be in fluid communication with the chamber 118. The rim 139 may be supported on the first end portion of the body 138 and coupled to the tank 112 as described in greater detail below. Further, or instead, the yoke 140 may be releasably supported on the second end portion 142 of the body 138 of the coupling 110 to decouple the aerostat 104 from the tank 112 as buoyancy of the lifting gas 121 in the aerostat 104 lifts the aerostat 104 upward, in a direction away from the crown 116 of the tank 112. In certain instances, the coupling 110 may include a valve 144 disposed in the passage 143. The valve 144 may include any one or more of the various different features— and may be operable according to any one or more of the various different techniques—described in U.S. patent application Ser. No. 17/865,201, filed Jul. 14, 2022, and entitled "VALVING FOR CONTROLLING GAS FLOW," the entire contents of which are hereby incorporated herein by reference.

In general, the rim 139 of the coupling 110 may be secured to the crown 116 of the tank 112 to facilitate expansion of the aerostat 104 away from the tank 112 as the lifting gas 121 produced in the chamber 118 moves into the aerostat 104 via the coupling 110. As an example, the reactor 102 may additionally, or alternatively, include a first plate 145 and a second plate 146, and the rim 139 of the coupling 110 may be supported on the tank with material of the tank 112 disposed between the first plate 145 and the second plate 146 and the first plate 145 and the second plate 146 attached to one another (e.g., via bolts or other fasteners). In particular, the first plate 145 may be disposed in the chamber 118, and the second plate 146 may be disposed on the outer surface 137 of the tank 112 along the crown 116. In certain implementations, the portion of the crown 116 disposed between the first plate 145 and the second plate 146 may be thicker than other portions of the crown 116 and may define one or more apertures to accommodate the use of one or more corresponding mechanical fasteners to pass through the crown 116 to engage the first plate 145 and the second plate 146 to one another.

The rim 139 of the coupling 110 may be releasably secured to the second plate 146 (and, thus, from the tank 112) in some instances. Such separability of the coupling 110 from the tank 112 may facilitate transporting the reactor 102 to remote locations in the field. For example, with the coupling 110 removed, it may be easier to fold the tank 112 into a compact form factor with less of a risk of damaging the coupling 110 and/or the tank 112 itself. Thus, continuing with this example, the coupling 110 may be attachable to the tank 112 near in time to the use of the reactor 102 to inflate the aerostat 104 for launch. Further, or instead, the releasable separation of the rim 130 of the coupling 110 from the second plate 146 on the tank 112 may facilitate repairing and replacing portions of the reactor 102 in the field. Additionally, or alternatively, the releasable separation of the rim 130 of the coupling 110 may facilitate securing the aerostat 104 along the second end portion 142 of the coupling 110 (e.g., using a "roll sock" technique of the aerostat 104 secured between the yoke 140 and the second end portion 142 of the body 138) without the tank 112 constraining movement of the coupling 110 and, thus, reducing the potential for damaging the tank 112 and/or the aerostat 104 as the system 100 is assembled in the field to launch the aerostat 104.

In certain implementations, the reactor 102 may additionally, or alternatively, include sealing material disposed between the rim 139 of the coupling and the second plate 146 to reduce the likelihood that the lifting gas 121 may escape between the rim 139 and the second plate 146 releasably secured to one another. As an example, the reactor 102 may additionally, or alternatively, include an O-ring 147 and a surface 148 of the rim 139 facing the second plate 146 may define a groove 149. The O-ring 147 may be disposed in the groove 149 with the surface 148 of the rim 139 facing the second plate 146 such that the O-ring 147 provides sealing along the interface between the rim 139 and the second plate 146. The releasable securement of the coupling 110 to the tank 112 via the second plate 146 may include compressing O-ring 147 between the rim 139 and the second plate 146, as may be useful for reducing the potential for the lifting gas 121 to leak from the reactor 102 instead of being directed to the aerostat 104. Stated, differently, compression of a sealing material, such as the O-ring 147, between the rim 139 and the second plate 146 may increase the likelihood of efficient use of the activated aluminum 119 and water to produce the lifting gas 121 to provide buoyancy to the aerostat 104.

In general, the coupling 110 may be releasably securable to the tank 112 via the second plate 146 according to any one or more of various, different techniques that may be reliably and quickly carried out in the field. As an example, the coupling 110 may be releasably securable to the tank 112 using any one or more of various, different quick-coupling techniques that may be carried out manually, without the use of tools. As used in this context, such quick-coupling techniques may include the use of any one or more of various, different latches and/or cam locks.

As an example, the reactor 102 may additionally, or alternatively, include two or more cam locks 150 supported on the second plate 146, with each one of the two or more cam locks 150 may include a respective instance of the cam 151. Continuing with this example, the rim 139 may include a ridge 152 (e.g., a surface having an arcuate profile in cross-section) circumscribing the passage 143 of the coupling 110, and the cam 151 of each one of the two or more cam locks 150 may be rotatable in a first direction into releasable engagement with the ridge 152 of the rim 139 to secure the passage 143 of the coupling 110 in fluid communication with the chamber 118 of the tank 112. Similarly, the cam 151 of each one of the two or more cam locks 150 may be rotatable in a second direction (opposite the first direction) to release the respective instance of the cam 151 from the rim 139 such that the coupling 110 may be removed from the second plate 146.

In certain instances, with the two or more cam locks 150 releasably engaged with the ridge 152 of the rim 139 of the coupling 110, the two or more cam locks 150 may be circumferentially spaced apart from one another about a circumference of the ridge 152 of the rim 139. As compared to a monolithic cam lock that circumscribes an entire circumference to be secured in place, the two or more cam locks 150 may be more easily fabricated (e.g., without the need to injection mold a large cylindrical element). For example, typically, the largest hydraulic diameter monolithic cam lock is about 3.75 inch (nominally identified as a 4 inch coupling). However, for implementations of the system 100 in which up to 20 kg of the activated aluminum 119 is reacted with water 120, a monolithic cam lock coupling of about 8 inches in hydraulic diameter would be required. Thus, as may be appreciated from this example, each one of the two or more cam locks 150 may be easily fabricated while also being combinable to work together to provide quick-coupling about a large circumference of the ridge 152 to hold the coupling 110 in place on the second plate 146.

In general, the aerostat 104 may be any one or more of various, different types of lighter-than-air aircraft that gain lift primarily from aerostatic lift, in contrast to aerodynes that primarily make use of aerodynamic lift requiring movement of a wing surface through air. The aerostat 104 may contain a quantity of the lifting gas 121 such that the average density of the aerostat 104 (containing the quantity of the lifting gas 121 and inclusive of the payload 124) is less than or equal to the density of air at some altitude and, thus, the aerostat is at least neutrally buoyant in air for a period. Unless otherwise specified or made clear from the context, the aerostat 104 may include any manner and form of object that can receive lifting gas to have at least some degree of buoyancy in air, whether in an indoor or an outdoor environment. Accordingly, as used herein, the aerostat 104 may include any one or more of various, different manned or unmanned craft, dirigible or non-dirigible craft, independently propelled or floating craft, rigid or nonrigid craft, tethered or untethered craft, or combinations thereof. By way of example and not limitation, the aerostat 104 may include any one or more of the features of aerostats described in U.S. patent application Ser. No. 17/586,759, filed on Jan. 27, 2022, and entitled "REMOTE GENERATION OF LIFTING GAS."

Having described various aspects of the reactor 102 that may be useful for separating particulates or other contaminants from the lifting gas 121, attention is directed now to additional or alternative aspects of reactors that may be useful for achieving efficient separation of contaminants from a lifting gas that has been generated according to any one or more of the various different techniques described herein while facilitating rapid inflation of an aerostat that may be coupled to such reactors.

Figure 2:
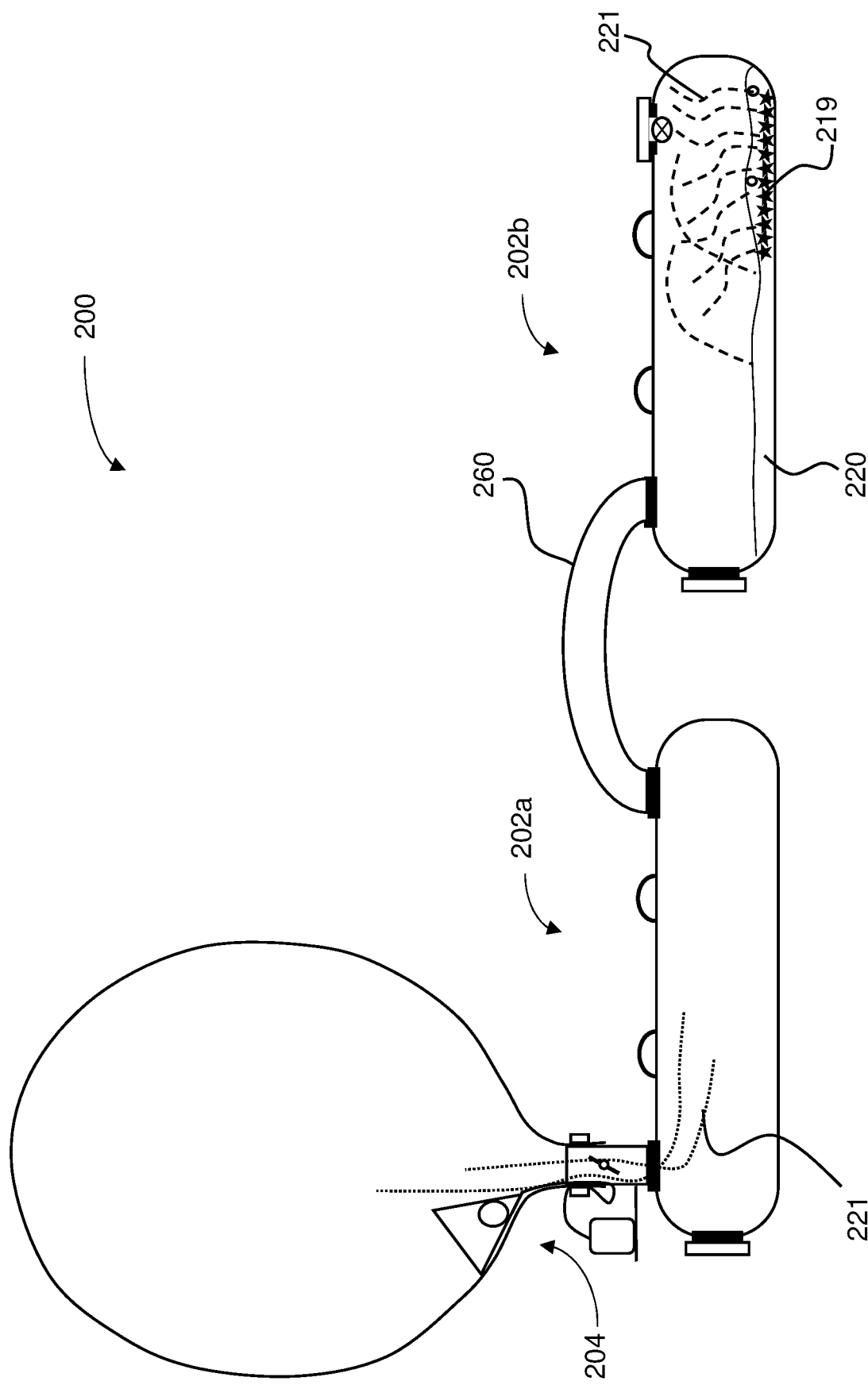
FIG. 2 is a schematic representation of a system for launching an aerostat, the system including a first reactor, a second reactor, and an aerostat.

Referring now to FIG. 2, a system 200 may include a first reactor 202a, a second reactor 202b, an aerostat 204, and a conduit 206. The first reactor 202a and the second reactor 202b may be identical to one another and coupled in fluid communication with one another via the conduit 206. The aerostat 204 may be supported on the first reactor 202a according to any one or more of the various, different techniques described herein, and the aerostat 204 may be in fluid communication with the second reactor 202b via the conduit 206 and the first reactor 202a. Thus, for example, activated aluminum 219 and water 220 may be reacted with one another in the second reactor 202b according to any one or more of the various, different techniques described herein. As the reaction of the activated aluminum 219 and water 220 progresses in the second reactor 202b, a lifting gas 221 is produced in the second reactor 202b. As the lifting gas 221 impacts the second reactor 202b, solid particles and other contaminants may fall out of the lifting gas 221, settling in the second reactor 202b. Thus, the lifting gas 221 moving in to the first reactor 202a via the conduit 206 (which may be rigid or flexible) may have a substantially reduced contaminant content as compared to the lifting gas 221 in the second reactor 202b and, thus, the first reactor 202a may be cleaner than the second reactor 202b. Given this difference, it may be useful to switch the reactor that is used for the reaction between successive uses of the first reactor 202a and the second reactor 202b. Further, as compared to the use of a single reactor, the combination of the first reactor 202a and the second reactor 202b may facilitate generating the lifting gas 221 using a smaller overall volume.

Figure 3:
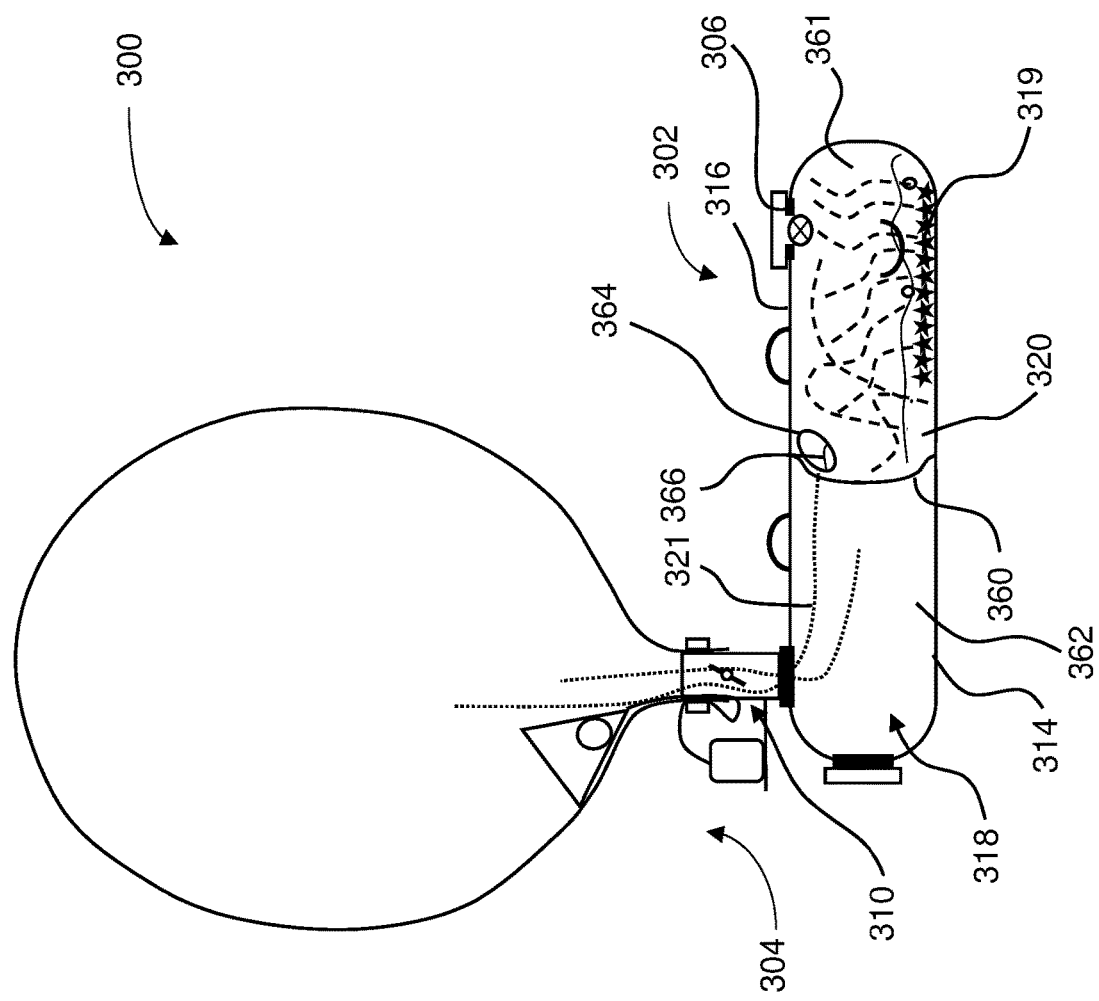
FIG. 3 is a schematic representation of a system for launching an aerostat, the system including a reactor and the aerostat, the reactor including a divider spanning a maximum dimension of a base of a tank of the reactor with a chamber of the reactor in an inflated state.

Referring now to FIG. 3, a system 300 may include a reactor 302 and an aerostat 304. The aerostat 304 may be coupled to the reactor 302 according to any one or more of the various, different techniques described herein. The reactor 302 may define a chamber 318, and the reactor 302 include a divider 360 disposed in the chamber 318 and separating the chamber into a first section 361 and a second section 362.

In general, the divider 360 may facilitate absorbing the impact of ejecta generated from the reaction of activated aluminum 319 and water 320 to form a lifting gas 321 in the first section 361 of the chamber 318. As an example, the divider 360 may define at least one aperture 364 through which the lifting gas 321 may flow from the first section 361 of the chamber 318 to the second section 362 of the chamber. It shall be appreciated that movement of the lifting gas 321 through the at least one aperture 364 may impart local turbulence (e.g., swirl) to the lifting gas 321, as may be useful for facilitating removal of particles from the lifting gas 321 before the lifting gas 321 reaches the aerostat 304. In some implementations, the divider 360 may additionally include at least one flap 366 in a corresponding instance of the at least one aperture 364, and the at least one flap 366 may be movable in response to pressure of the lifting gas 321 moving through the at least one aperture 364 in a direction from the first section 361 toward the second section 362 of the chamber 318. Accordingly, the at least one flap 366 may facilitate removal of particulates or other contaminants from the lifting gas 321 with little or no increase in pressure of the lifting gas 321 within the chamber 318.

In certain implementations, the divider 360 may be generally vertically oriented within the chamber 318. For example, the divider 360 may extend from a base 314 to a crown 316 at least partially defining the chamber 318. Thus, the divider 360 may be flexibly supported in the chamber 318 to filter particles, even as the chamber 318 expands. Further, or instead, the reactor 302 may include a first port 306 in fluid communication with a coupling 310 of the reactor 302 via the at least one aperture 364 of the divider 360.

Figure 4:
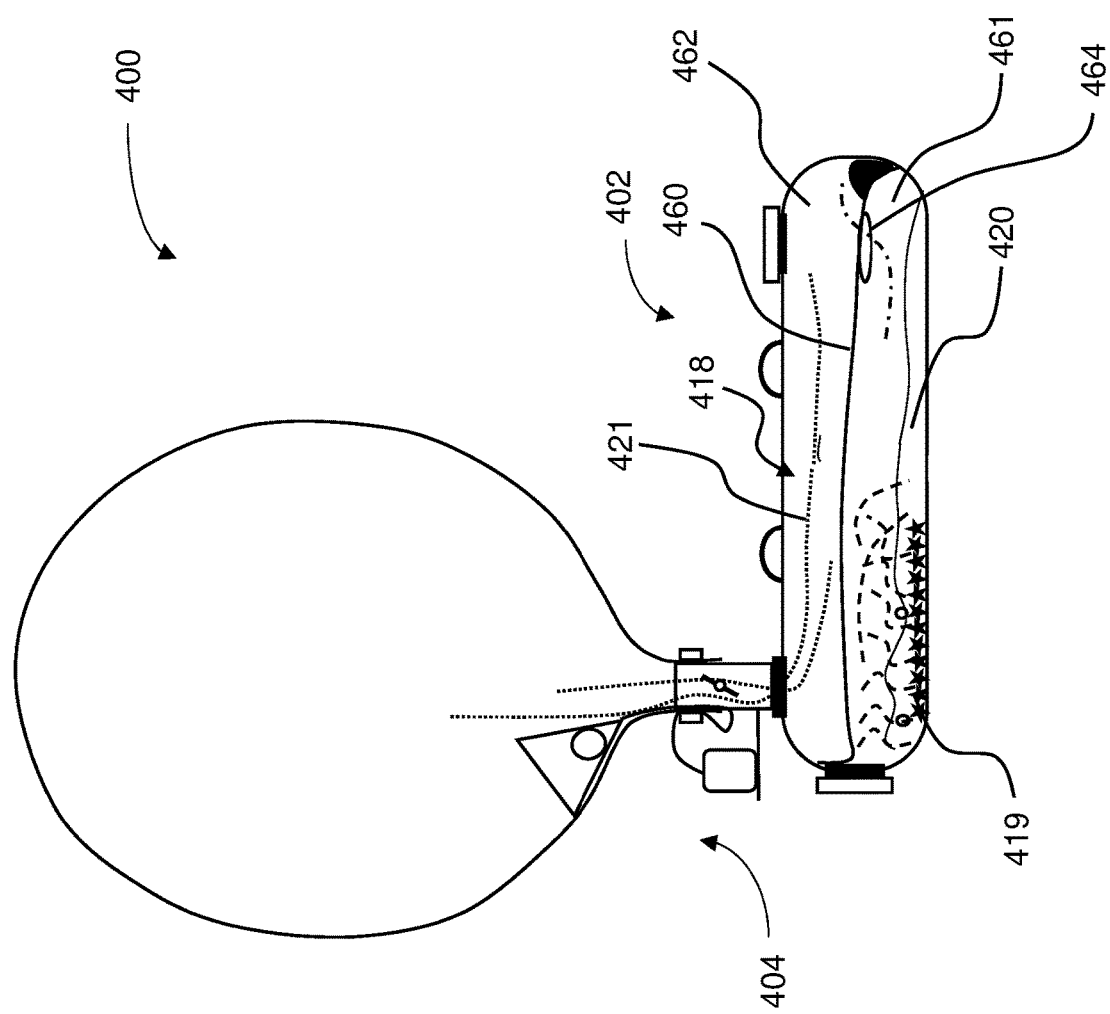
FIG. 4 is a schematic representation of a system for launching an aerostat, the system including a reactor and the aerostat, the reactor including a divider extending from a base to a crown of a tank of the reactor.

Referring now to FIG. 4, a system 400 may include a reactor 402 and an aerostat 404. The aerostat 404 may be coupled to the reactor 402 according to any one or more of the various, different techniques described herein. The reactor 402 may define a chamber 418, and the reactor 402 may include a divider 460 that is generally horizontally oriented within the chamber 418 to filter particles from a lifting gas 421 generated by reaction of activated aluminum 419 and activated aluminum in a first section 461 of the chamber 418. As the lifting gas 421 rises in the first section 461 of the chamber 418, the lifting gas 421 may pass through at least one aperture 464 defined by the divider 460 (e.g., with or without a flap disposed in the at least one aperture 464). Thus, as the lifting gas 421 moves through the at least one aperture 464, the divider 460 may impart local turbulence (e.g., swirl) to the flow of the lifting gas 421 to facilitate separating particles from the lifting gas 421 before the lifting gas 421 reaches the aerostat 404 via the second section 462 of the chamber 418.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. A reactor for generating lifting gas, the reactor comprising:
   a first port;
   a second port;
   a coupling releasably securable in fluid communication with an aerostat;

a tank including a base and a crown defining at least a portion of a chamber therebetween, the first port and the coupling each supported on the crown, the second port supported on the tank away from the crown, the chamber in fluid communication with each one of the first port, the second port, and the coupling, the chamber expandable between the crown and the base from an uninflated state to an inflated state and, with the tank in the inflated state, a maximum height of the chamber less than a maximum dimension of the base; and a support extending from the coupling into the chamber wherein, with the chamber in the uninflated state, the support spaces at least a portion of the crown from the base.

2. The reactor of claim 1, wherein the maximum dimension of the base is a diagonal dimension and, in the inflated state, the maximum height of the chamber is less than about one-third of the maximum dimension of the base.

3. The reactor of claim 1, wherein, in the inflated state, the base is rectangular, and a ratio of long to short sides is less than about 6:1.

4. The reactor of claim 1, wherein at least a portion of the tank is flexible to unfold from a folded configuration as the chamber expands from the uninflated state to the inflated state.

5. The reactor of claim 1, wherein the first port and the coupling each define respective longitudinal axes intersecting the base, and the respective longitudinal axes of the first port and the coupling are non-intersecting within the chamber in the inflated state.

6. The reactor of claim 1, wherein the coupling includes a body, a rim, and a yoke, the body has a first end portion and a second end portion and defines a passage therebetween, the passage is in fluid communication with the chamber, the rim is supported on the first end portion of the body, and the yoke is releasably supported on the second end portion of the body to decouple the aerostat from the tank.

7. The reactor of claim 6, further comprising a first plate and a second plate, wherein the rim of the coupling is supported on the tank with material of the tank disposed between the first plate and the second plate, the first plate is disposed in the chamber, the second plate is along an outer surface of the crown, and the rim of the coupling is releasably secured to the second plate, and the first plate and the second plate are attached to each other.

8. The reactor of claim 7, further comprising two or more locks supported on the second plate, wherein each of the two or more locks includes a respective cam, the rim includes a ridge circumscribing the passage, the respective cam of each of the two or more locks is rotatable into releasable engagement with the ridge of the rim with the passage of the coupling in fluid communication with the chamber of the tank.

9. The reactor of claim 8, wherein, with the two or more locks releasably engaged with the ridge of the rim, the two or more locks are circumferentially spaced apart from one another about a circumference of the ridge of the rim.

10. The reactor of claim 8, further comprising an O-ring, wherein the rim defines a groove along a surface of the rim facing the second plate, the O-ring is disposed in the groove with the surface of the rim facing the second plate.

11. The reactor of claim 1, further comprising a valve supported in the first port, wherein the valve is biased in a closed position, and the valve is openable to introduce one or more reactants into the chamber from an environment outside of the chamber.

12. The reactor of claim 1, wherein at least a portion of the support extending into the chamber defines a plurality of orifices.

13. The reactor of claim 1, wherein the support includes a cap section, and the cap section having a rounded surface positionable in contact with the base within the chamber.

14. The reactor of claim 1, further comprising a divider disposed in the chamber and separating the chamber into a first section and a second section, wherein the divider defines at least one aperture through which the first section and the second section of the chamber are in fluid communication with one another.

15. The reactor of claim 14, wherein the first port is in fluid communication with the coupling via the at least one aperture of the divider.

16. The reactor of claim 14, wherein the divider includes at least one flap, each flap is disposed in a corresponding aperture and movable in response to pressure of reaction products moving in a direction from the first section toward the second section of the chamber.

17. The reactor of claim 14, wherein the divider extends from the base to the crown in the chamber, and the divider is flexible as the chamber expands from the uninflated state to the inflated state.

18. The reactor of claim 14, wherein, with the chamber in the inflated state, the divider spans the maximum dimension of the base.

19. The reactor of claim 1, further comprising one or more handles supported on an outer surface of the tank.

\* \* \* \* \*